United States Patent
Mochizuki

(10) Patent No.: US 7,452,084 B2
(45) Date of Patent: Nov. 18, 2008

(54) PROJECTOR WITH A DEVICE FOR MEASURING ANGLE OF INCLINATION

(75) Inventor: Kazuo Mochizuki, Tokyo (JP)

(73) Assignee: Nec Viewtechnology, Ltd., Tokyo (JP)

( * ) Notice: Subject to any disclaimer, the term of this patent is extended or adjusted under 35 U.S.C. 154(b) by 356 days.

(21) Appl. No.: 11/137,564

(22) Filed: May 26, 2005

(65) Prior Publication Data

US 2005/0270496 A1 Dec. 8, 2005

(30) Foreign Application Priority Data

May 31, 2004 (JP) .............................. 2004-161494

(51) Int. Cl.
*G03B 21/00* (2006.01)
*G03B 21/14* (2006.01)
*H04N 3/22* (2006.01)
*H04N 3/26* (2006.01)

(52) U.S. Cl. ..................... 353/70; 353/121; 348/745; 348/806

(58) Field of Classification Search ............ 353/30, 353/69, 70, 79, 122, 121; 348/744–746, 348/806

See application file for complete search history.

(56) References Cited

U.S. PATENT DOCUMENTS 6,520,646 B2 * 2/2003 Rodriguez et al. ............ 353/69
7,150,536 B2 * 12/2006 Inoue .......................... 353/69

FOREIGN PATENT DOCUMENTS

| EP | 1 395 050 A1 | 3/2004 |
|----|---|---|
| JP | 6-253241 | 9/1994 |
| JP | 3092698 | 12/2002 |
| JP | 2003-198993 | 7/2003 |
| JP | 2003-289485 | 10/2003 |
| JP | 2005-318355 | 11/2005 |

* cited by examiner

*Primary Examiner*—Melissa Jan Koval
(74) *Attorney, Agent, or Firm*—McGinn IP Law Group, PLLC

(57) ABSTRACT

A projector includes a projection device, a cross line positional information acquiring device for acquiring positional information of a cross line between a projection surface of the projection device and a plane crossing the projection surface, an inclination detecting device for calculating an angle of inclination between a projection optical axis of the projection device and the projection surface based on the positional information acquired by the cross line positional information acquiring device, and an image distortion correcting device for correcting a trapezoidal distortion of an input image supplied to the projection device, based on the angle of inclination calculated by the inclination detecting device.

20 Claims, 17 Drawing Sheets

PROJECTOR WITH A DEVICE FOR MEASURING ANGLE OF INCLINATION

BACKGROUND OF THE INVENTION

1. Field of the Invention

The present invention relates to a projector having a device for measuring an angle of inclination between the projection optical axis of a projection device and a projection surface, and a method for correcting a trapezoidal distortion.

2. Description of the Related Art

As projectors have become smaller in size and higher in performance due to rapid advances in solid-state pixel display device technology, projectors for projecting images are being widely used and have become more attractive for use as large-size display apparatuses to replace home display-type TV sets.

However, since a projector, unlike a display-type TV set, projects an image onto a projection surface such as a screen or a wall, the displayed image tends to be distorted, depending on the relative relationship between the projection optical axis of the projector and the projection surface. The specification etc. of Japanese Patent Laid-open Publication No. 281597/97 discloses a process of adjusting the angle of a liquid crystal display unit. The process has the step of detecting the installation angle of a liquid crystal projector and the step of detecting the distance between the liquid crystal projector and the projection surface onto which an image is projected. According to the disclosed processes, the angle of the liquid crystal display unit needs to be mechanically adjusted.

There has also been disclosed a projector apparatus that detects the distance from the projection lens to a screen, calculates the angle of inclination, then automatically corrects the distortion based on the detected distance. See the specification etc. of Japanese Patent Laid-open Publication No. 355740/92, No. 81593/2000, and No. 122617/2000 for details.

In these prior art systems or processes in which the distance to the screen is detected, however, the distance measuring device is provided independently of the projector. The projected images are not utilized. Further, the measured distance and the actual distance to the screen do not always coincide, if the screen is surrounded by a frame projecting forwardly toward the projector, or the screen is set back away from the projector.

The specification etc. of Japanese Patent Laid-open Publication No. 169211/2001 discloses a process of correcting a distortion by projecting a beam spot onto a curved screen from an angle-controllable laser pointer. According to the disclosed process, a spot image is generated and projected onto a screen by the projector, and the beam spot and the projected spot image are captured by a camera for measuring their positions. The spot image is moved until it overlaps with the beam spot, then the coordinate of the pixel of the spot image in the frame memory is replaced with the coordinate of the beam spot and stored in a coordinate transform parameter memory. Although this process is excellent for acquiring an angle accurately, it needs a means to control the different angles (positions) of the laser pointer, and also requires a complicated system configuration, since it is necessary to employ a laser pointer and a digital camera having a two-dimensional array of imaging elements.

According to another disclosed projector that sells in the market, the inclination of the projector in the vertical direction, which easily causes a distortion, is detected by a gravity sensor, when a screen is set vertically. The distortion is corrected depending on the detected inclination. See the specification etc. of Japanese Patent Laid-open Publication No. 5278/2003 for details. However, the projector cannot correct the distortion correctly, if the screen is not set vertically or the screen is inclined in the horizontal plane with respect to the projection optical axis of the projector.

Once the angles of inclination of optical axis of the projector apparatus are detected with regards to the screen in the vertical and horizontal directions, an image can be projected without distortion from the projector onto the screen by means of conventional techniques such as the conversion of the coordinates of a frame memory of the projector, etc.

SUMMARY OF THE INVENTION

It is an object of the present invention to provide a projector having a trapezoidal distortion correcting device that is capable of measuring, with a simple mechanism, angles of inclination in horizontal and vertical directions of a projection surface with respect to the projection optical axis of a projector, for the purpose of correcting distortions of images projected onto the projection surface by the projector.

According to an aspect of the present invention, a projector includes a projection device, a cross line positional information acquiring device for acquiring positional information of a cross line between a projection surface of the projection device and a plane crossing the projection surface, an inclination detecting device for calculating an angle of inclination between a projection optical axis of the projection device and the projection surface based on the positional information acquired by the cross line positional information acquiring device, and an image distortion correcting device for correcting a trapezoidal distortion of an input image supplied to the projection device, based on the angle of inclination calculated by the inclination detecting device.

According to another aspect of the present invention, a projector includes a projection device, a cross line positional information acquiring device for acquiring positional information of a cross line between a projection surface of the projection device and a plane crossing the projection surface, a vertical angle-of-inclination acquiring device for detecting an angle of inclination of a projection optical axis of the projection device in a vertical plane, an inclination detecting device for calculating an angle of inclination between the projection optical axis and the projection surface in a horizontal plane based on the positional information acquired by the cross line positional information acquiring device, and an image distortion correcting device for correcting a trapezoidal distortion of an input image supplied to the projection device, based on the angle of inclination in the horizontal plane calculated by the inclination detecting device and based on the angle of inclination in the vertical plane calculated by the vertical angle-of-inclination acquiring device.

According to yet another aspect of the present invention, a method of correcting a trapezoidal distortion of a projector includes the steps of acquiring positional information of a cross line between a projection surface of a projection device and a plane crossing the projection surface, calculating an angle of inclination between a projection optical axis of the projection device and the projection surface based on the acquired positional information, and correcting a trapezoidal distortion of an input image supplied to the projection device, based on the calculated angle of inclination.

The present invention is advantageous in that a trapezoidal distortion of an image can be corrected with a simple mechanism, because horizontal and vertical angles of inclination of the projection surface with respect to the projection optical axis of the projector can be calculated, based on the positional information of a cross line between a basically vertical wall surface serving as the projection surface and a plane crossing the wall surface.

If the projector further includes a vertical inclination sensor, then only the horizontal angle of inclination needs to be acquired based on the positional information of the cross line. It is sufficient, in this case, that only a cross line between a front wall and a ceiling appears in the imaging range of the image sensor, and which is highly likely to occur. Therefore, the present invention is applicable to a wider range of uses, allowing for easy correction of a trapezoidal distortion due to horizontal and vertical inclinations of the projector.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
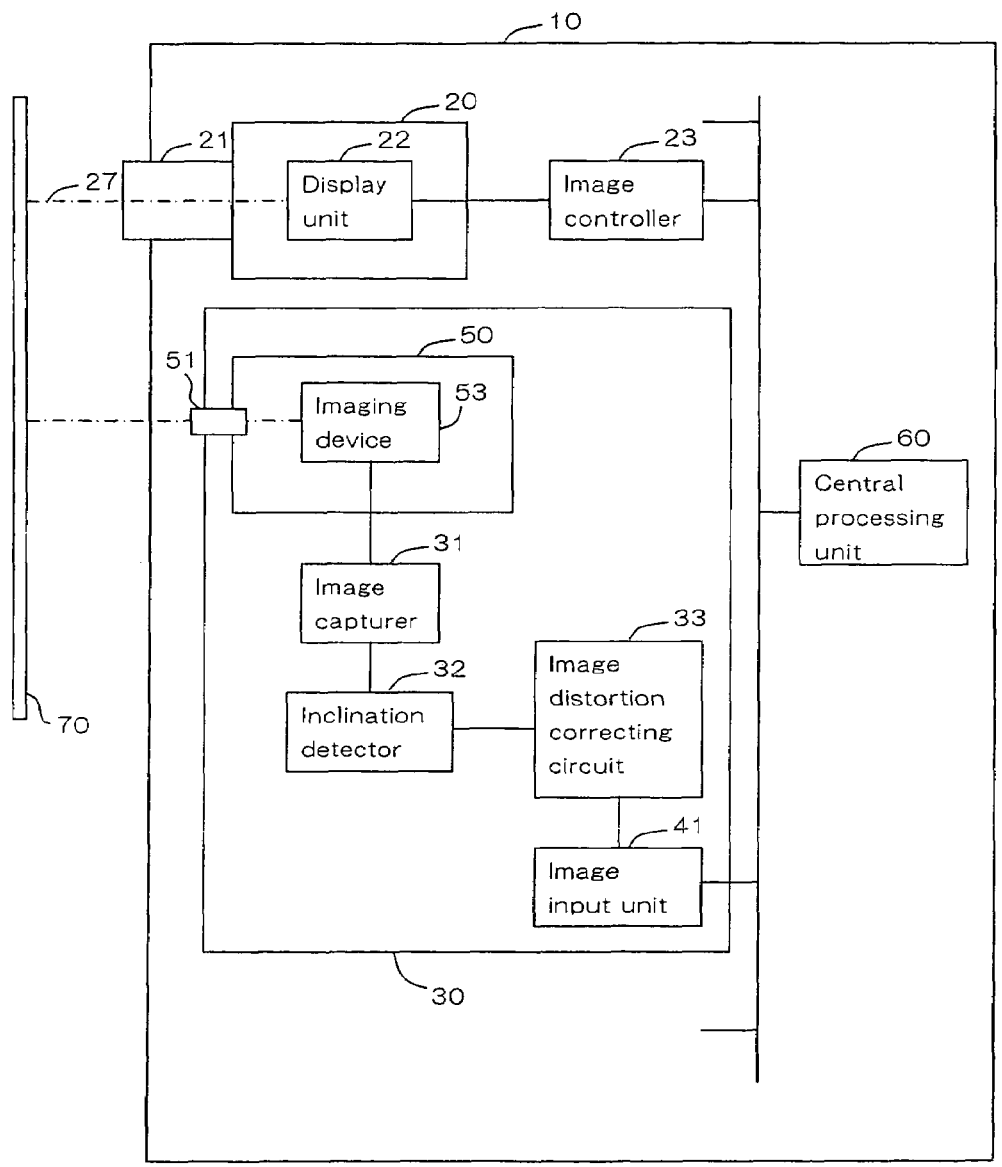
FIG. 1 is the block diagram of a projector having a trapezoidal distortion correcting device according to a first embodiment of the present invention.
Figure 2A:
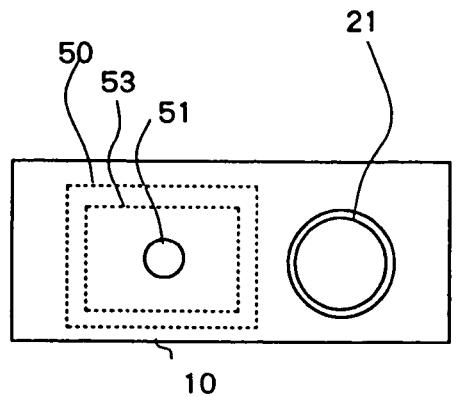
FIGS. 2A through 2C are front, side elevational, and plan views, respectively, of the projector having the trapezoidal distortion correcting device according to the first embodiment.
Figure 2B:
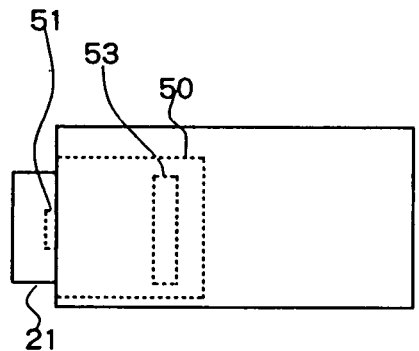
Figure 2C:
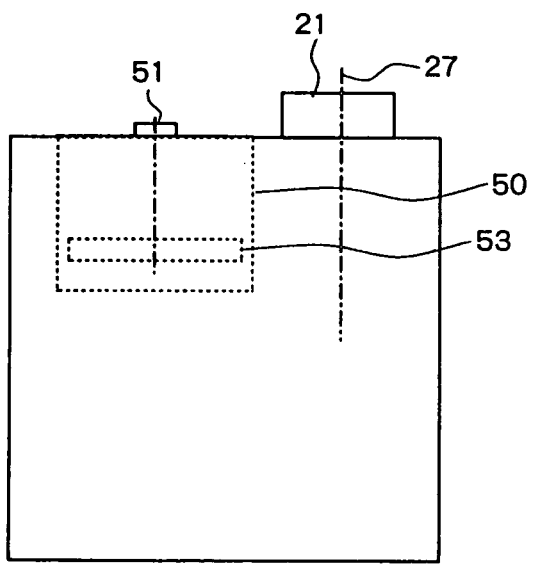

A projector having a trapezoidal distortion correcting device according to a first embodiment of the present invention will be described below with reference to FIGS. 1 and 2A through 2C.

As shown in FIGS. 1 and 2A through 2C, projector 10 has projection device 20 having projection lens 21 and display unit 22, image controller 23 for controlling an image generated by display unit 22, trapezoidal distortion correcting device 30, and central processing unit 60 for controlling the entire operation of projector 10. Trapezoidal distortion correcting device 30 calculates an angle of inclination between a front wall serving as projection surface 70 and projector 10, and corrects a distortion of an image that is inputted to trapezoidal distortion correcting device 30. Image controller 23 controls an image of display unit 22, based on an output signal from trapezoidal distortion correcting device 30, thereby correcting the distortion on the image displayed on projection surface 70. The image distortion is automatically corrected according to a predetermined process by central processing unit 60.

According to a first embodiment of the present invention, trapezoidal distortion correcting device 30 has image sensor 50, image capturer 31, inclination detector 32, image input unit 41, and image distortion correcting circuit 33. Image sensor 50 has imaging lens 51 and imaging device 53. Imaging lens 51 is disposed on a front surface of projector 10 and has an optical axis in a predetermined direction and a predetermined imaging range. Imaging device 53 is disposed perpendicularly to the optical axis of imaging lens 51. Imaging device 53 detects light that passes through imaging lens 51 and outputs desired positional information of an image represented by the detected light. Imaging device 53 has an imaging surface covering the imaging range of imaging lens 51. Imaging device 53 has a two-dimensional solid-state imaging device such as an image pickup tube or a CCD (Charge-Coupled Device) for outputting an image as a collection of pixels. Image capturer 31 captures an image from imaging device 53 as image information. Inclination detector 32 analyzes positional information of the captured image and calculates the angle of inclination between the front wall and projector 10. Image distortion correcting circuit 33 corrects a trapezoidal distortion of the image that is supplied to image input unit 41, based on the angle of inclination calculated by inclination detector 32. Image input unit 41 is supplied with video information that represents an image that is projected by projection device 20, and supplies an output signal to image controller 23.

Projector 10 according to the first embodiment of the present invention utilizes the positional information of a horizontal cross line between the front wall surface serving as projection surface 70 and a ceiling or a floor which crosses the front wall surface, and/or a vertical cross line between the front wall surface serving as projection surface 70 and a side wall surface which crosses the front wall surface. Specifically, a horizontal and/or vertical angle of inclination between projection optical axis 27 of projection device 20 of projector 10 and projection surface 70 is calculated, based on the positional information on the cross line acquired by imaging device 53 of image sensor 50.

The positional information of a cross line may be acquired by various processes. There are two processes available for acquiring the positional information of a cross line in an image by imaging device 53. According to the first process, the positional information of a cross line is acquired as a luminance change line in a captured image which represents the entire reflected light emitting from the reflecting surfaces including projection surface 70 in front of projector 10, through imaging lens 51 to imaging device 53. In this process, the cross line needs to be included in the imaging range of image sensor 50. Since the imaging means is a digital camera, and the cross line is usually recognized as a collection of luminance change spots, the positional information can be obtained by analyzing the pixels if there is a certain amount of luminance change. Since the angle formed between the front wall surface serving as projection surface 70 and the optical axis of the imaging lens, and the angle formed between a side wall surface, a ceiling, or a floor which crosses the front wall surface serving as projection surface 70 and the optical axis of the imaging lens, differs greatly, the cross line in an image generated by imaging device 53 can usually be detected as a change in the luminance of the reflected light. Filtering or other appropriate processing to image data may be used in order to acquire a clear boundary line.

The second process is applicable if the projection range of projection device 20 can be expanded sufficiently to cover a ceiling, a floor, or side walls. According to the second process, two or more test patterns each consisting of a vertical or a horizontal straight line are projected from projection device 20 onto front surfaces including projection surface 70, and bent points of the test patterns appearing on the captured image of reflected light are acquired. A cross line between a flat surface serving as the projection surface and a surface crossing the flat surface is calculated as a straight line joining the bent points.

For example, when a plurality of vertical test patterns are projected onto the wall surface serving as projection surface 70 and the ceiling crossing the wall surface, since the wall surfaces are inclined with respect to projection optical axis 27, images of bent test patterns are generated on the ceiling and the wall surface. Reflected light of the image of bent test patterns passes through imaging lens 51 of projector 10, and is applied to the imaging surface of imaging device 53 as test pattern images. Each of the test pattern images consists of two straight lines which are joined with each other at a cross point positioned at the cross line between the ceiling and the wall surface. Each set of the two crossing straight lines is determined by straight line equations using the coordinates of two detection points on each of the two straight lines. The cross point between the straight lines is determined as the cross point between the determined straight lines, and the cross line can be determined from the coordinates of the obtained two cross points according to a straight line equation This process is applicable to a projector which has a solid-state image display device.

A process of calculating an angle of inclination between the projection optical axis and the projection surface in the trapezoidal distortion correcting device of the projector according to the first embodiment of the present invention will be described below. It is assumed that projection optical axis 27 of projection lens 21 and the optical axis of imaging lens 51 lie parallel to each other. If projection optical axis 27 of projection lens 21 and the optical axis of imaging lens 51 do not lie parallel to each other, then an angle of inclination between projection optical axis 27 of projection lens 21 and projection surface 70 can be calculated, based on the relationship between projection optical axis 27 of projection lens 21 and the optical axis of imaging lens 51 which is known.

Figure 3A:
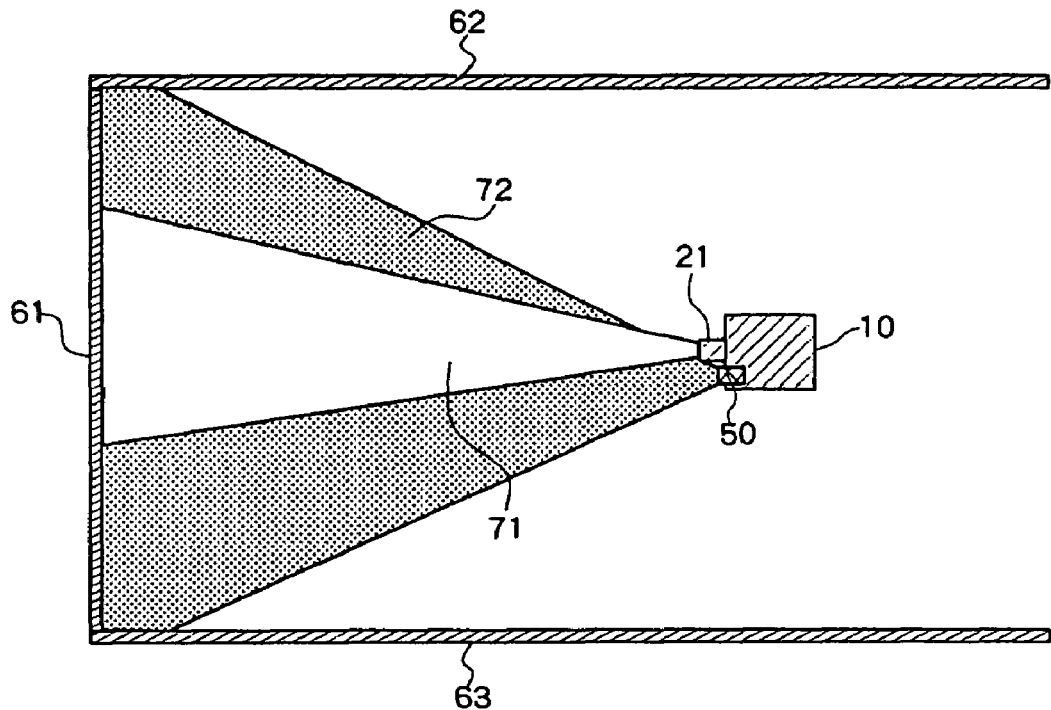
FIGS. 3A and 3B are horizontal and vertical cross-sectional views, respectively, showing the projected image range and the image sensor imaging range when a projector is set such that the imaging range of the image sensor includes walls, a ceiling, and a floor adjacent to the front wall, as well as the front wall.
Figure 3B:
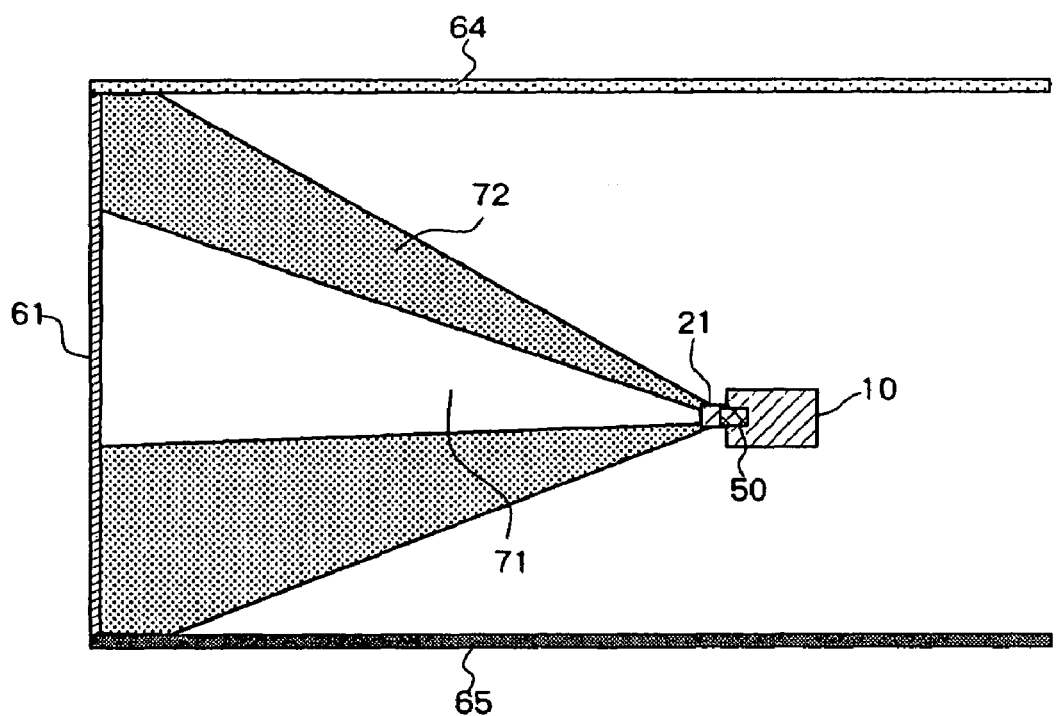
Figure 4:
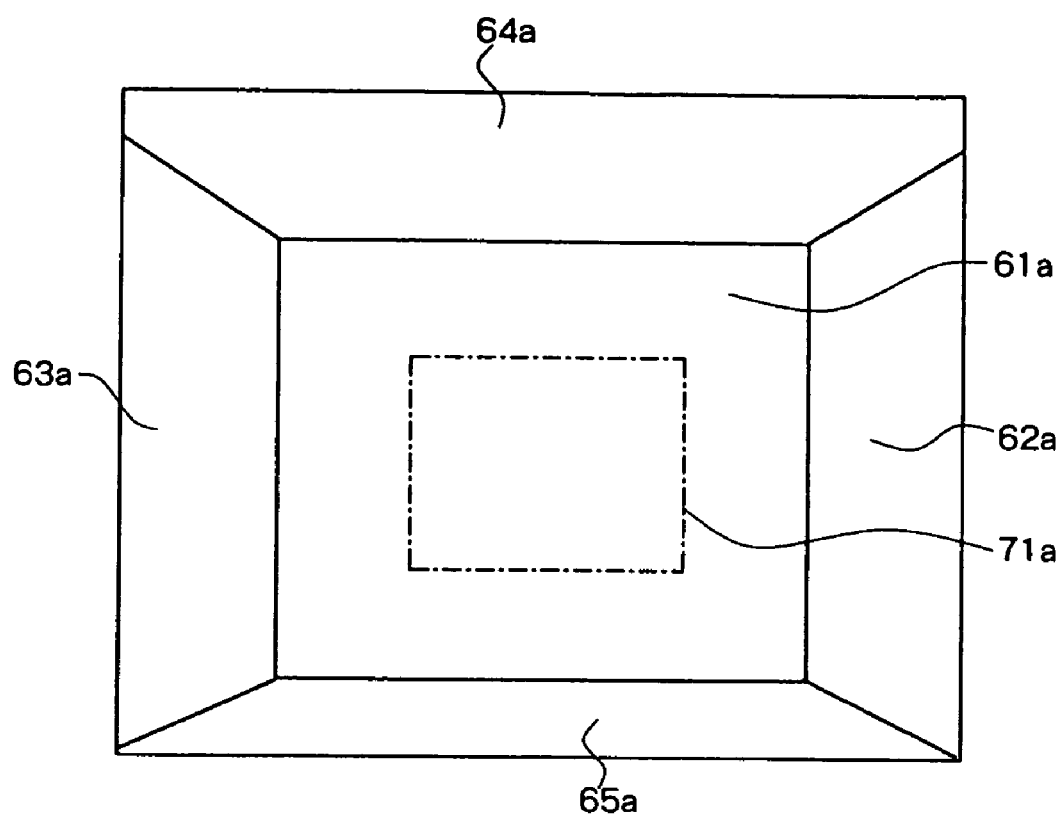
FIG. 4 is a view showing an image captured by the imaging device of the image sensor when a projector is set as shown in FIGS. 3A and 3B.

FIGS. 3A and 3B are horizontal and vertical cross-sectional views, respectively, showing the projected image range and the image sensor imaging range when a projector is set such that the imaging range of the image sensor includes walls, a ceiling, and a floor adjacent to the front wall, as well as the front wall. FIG. 4 is a view showing an image captured by the imaging device of the image sensor when a projector is set as shown in FIGS. 3A and 3B.

Projected image range 71 is a range in which an image projected from projection lens 21 is displayed, and image sensor imaging range 72 is a range in which an image is captured by image sensor 50. Projector 10 is usually set so as to project an image onto front wall 61 such that the image is displayed in the substantially central area of front wall 61 in the horizontal direction, and is designed to project an image with a slightly upward angle in the vertical direction. Therefore, the projected image is slightly directed upwardly with regard to the horizontal line of projector 10 in front-to-back direction. The imaging range of image sensor 50 is wider than the projected image range of projector 10. If projector 10 is set as shown in FIGS. 3A, 3B, and 4, then front wall 61, right side wall 62, left side wall 63, ceiling 64, and floor 65 are included in the imaging range of image sensor 50.

Figure 5A:
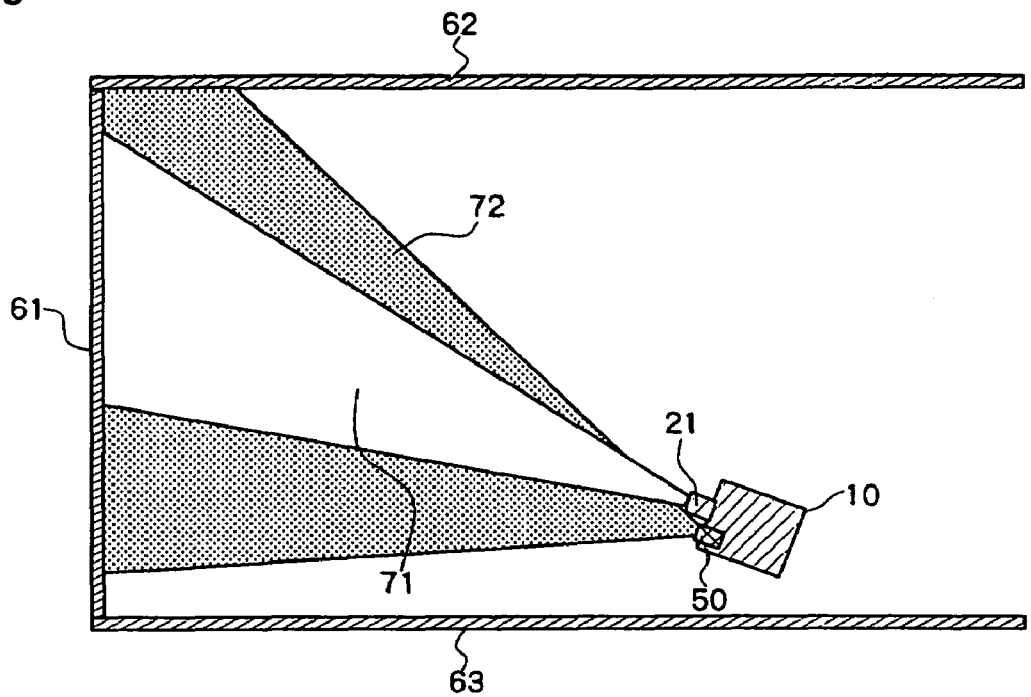
FIGS. 5A and 5B are horizontal and vertical cross-sectional views, respectively, showing a projected image range and an image sensor imaging range, when a projector is set such that an image is projected along a projection optical axis of the projector that is inclined with respect to a front wall in the horizontal plane.
Figure 5B:
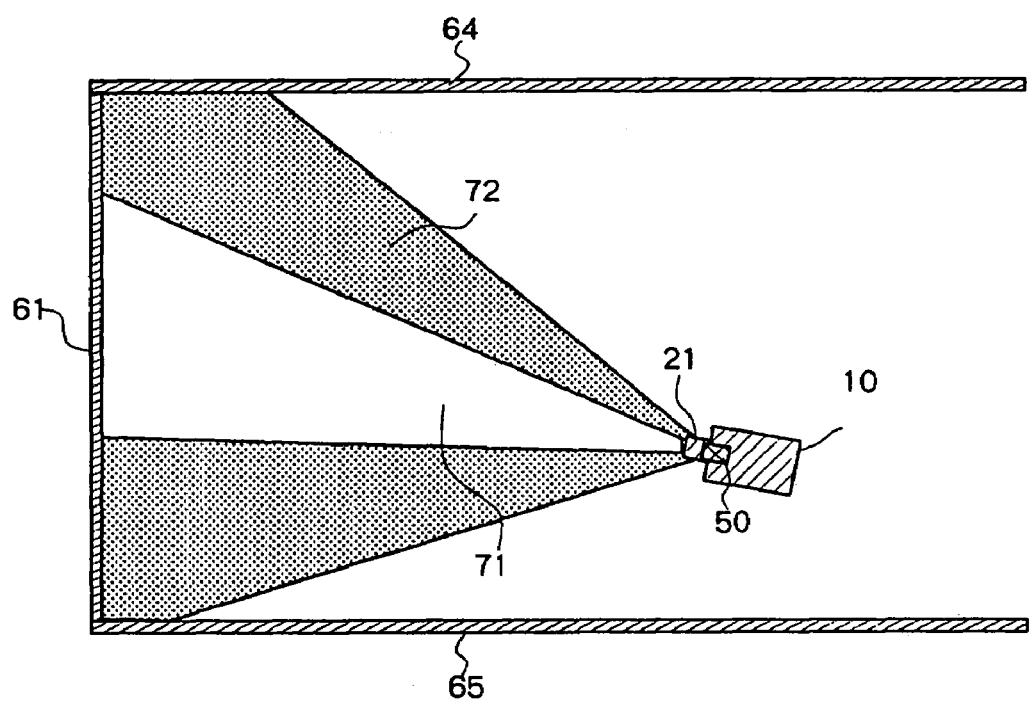
Figure 6:
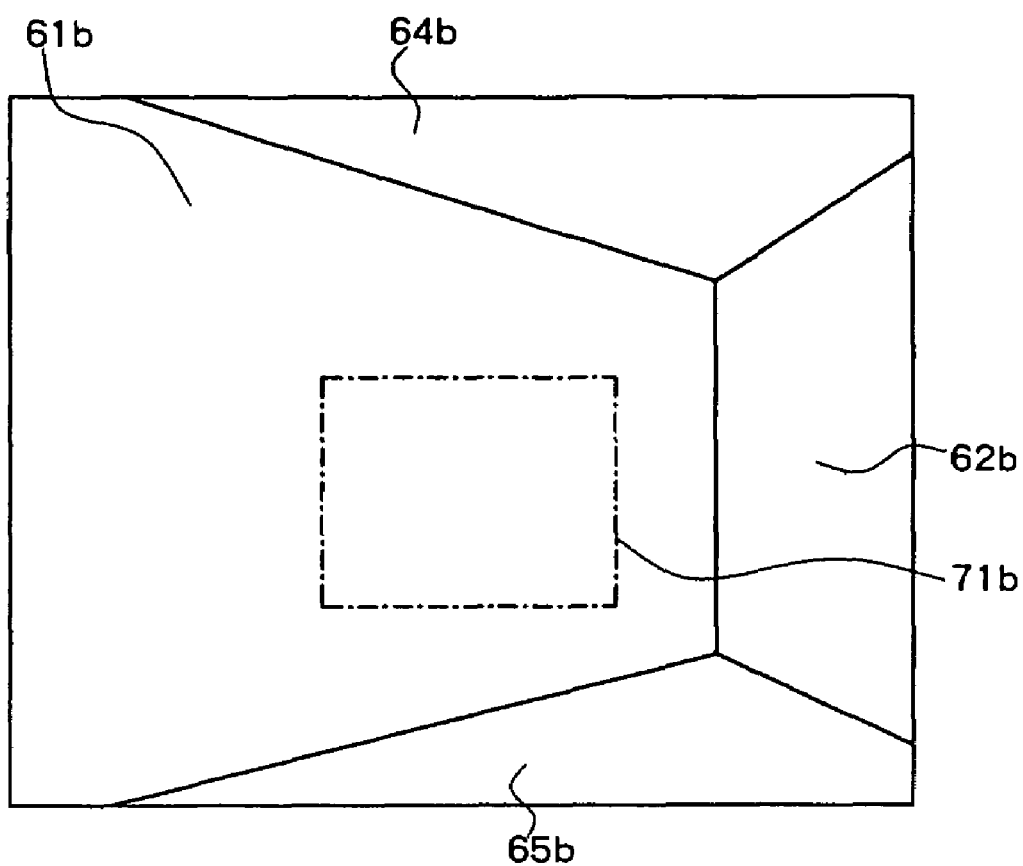
FIG. 6 is a view showing an image captured by an imaging device of the image sensor in the projector setup shown in FIGS. 5A and 5B.

Projectors are often set in an oblique direction in the horizontal plane, with the projection optical axis inclined to a front wall. This is due to the function which corrects a trapezoidal distortion of a projected image not only in the vertical direction, but also in the horizontal direction. FIGS. 5A and 5B are horizontal and vertical cross-sectional views, respectively, showing a projected image range and an image sensor imaging range, when a projector is set such that an image is projected along a projection optical axis of the projector that is inclined with respect to a front wall in the horizontal plane. FIG. 6 is a view showing an image captured by the imaging device of the image sensor when the projector is set as shown in FIGS. 5A and 5B.

Heretofore, it has been necessary to correct a horizontal trapezoidal distortion manually by using an adjustment bar or a pointer that indicates the projected position. According to another process, if a screen is set on a wall, then a horizontal trapezoidal distortion can be automatically corrected by detecting the frame of the screen. However, if an image is projected on a wall directly, a horizontal trapezoidal distortion still needs to be manually adjusted.

If an image is projected from projector 10 which is inclined only in the horizontal direction as shown in FIGS. 5A and 5B, then imaging device 53 of image sensor 50 captures an image as shown in FIG. 6. In FIG. 6, cross lines between front wall 61 and ceiling 64 and between front wall 61 and floor 65 are captured as inclined cross lines, unlike those in the captured image shown in FIG. 4.

Inclination detector 32 of trapezoidal distortion correcting device 30 detects these cross lines from the image that is generated by imaging device 53 of image sensor 50 and captured by image capturer 31, according to the process described above, generates parameters for correcting an image distortion, and outputs the generated parameters to image distortion correcting circuit 33.

Figure 7:
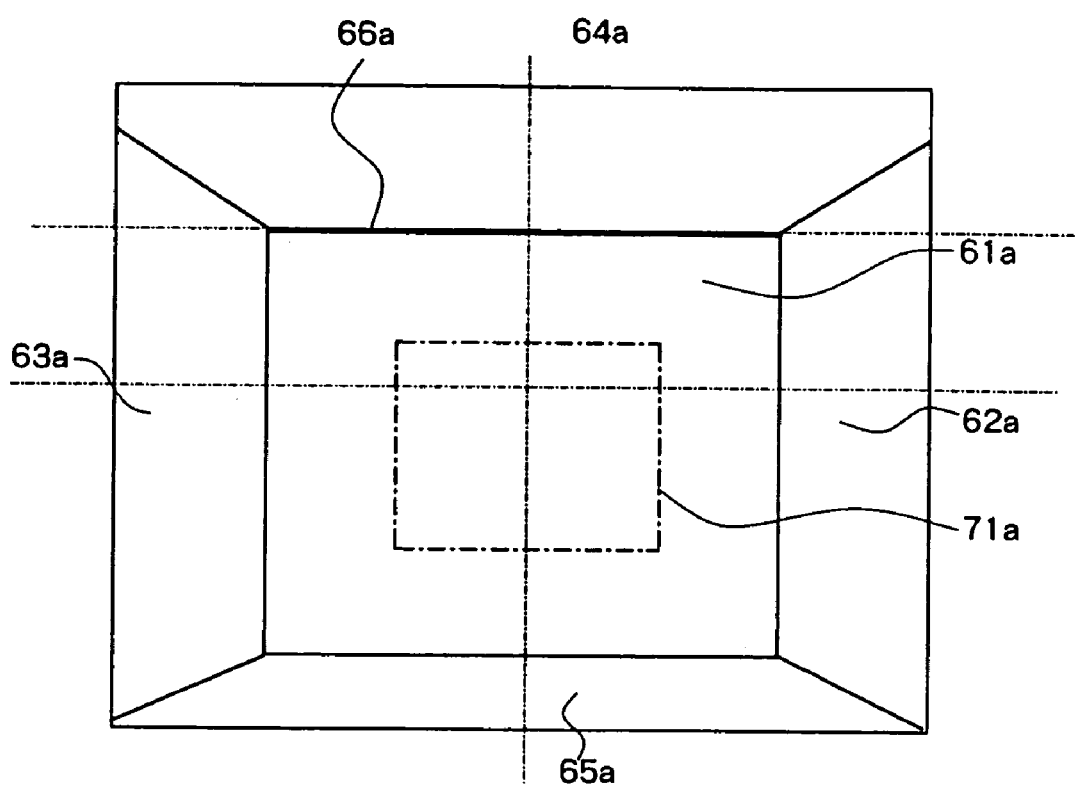
FIG. 7 is a view showing a cross line between the front wall and the ceiling that is detected from the captured image shown in FIG. 4.
Figure 8A:
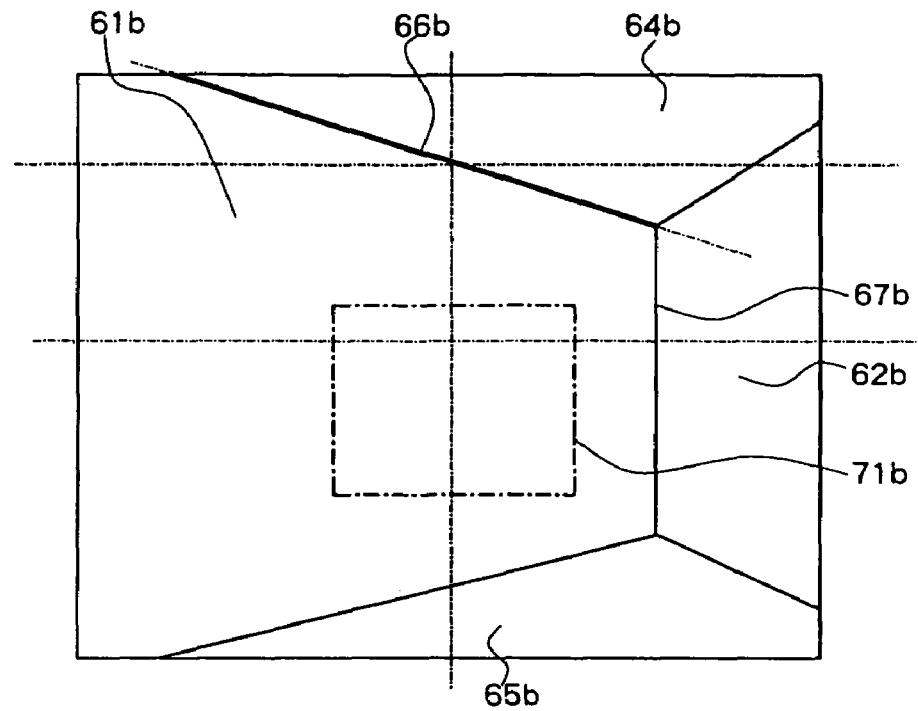
FIGS. 8A and 8B are views showing a cross line between the front wall and the ceiling that is detected from the captured image shown in FIG. 6.
Figure 8B:
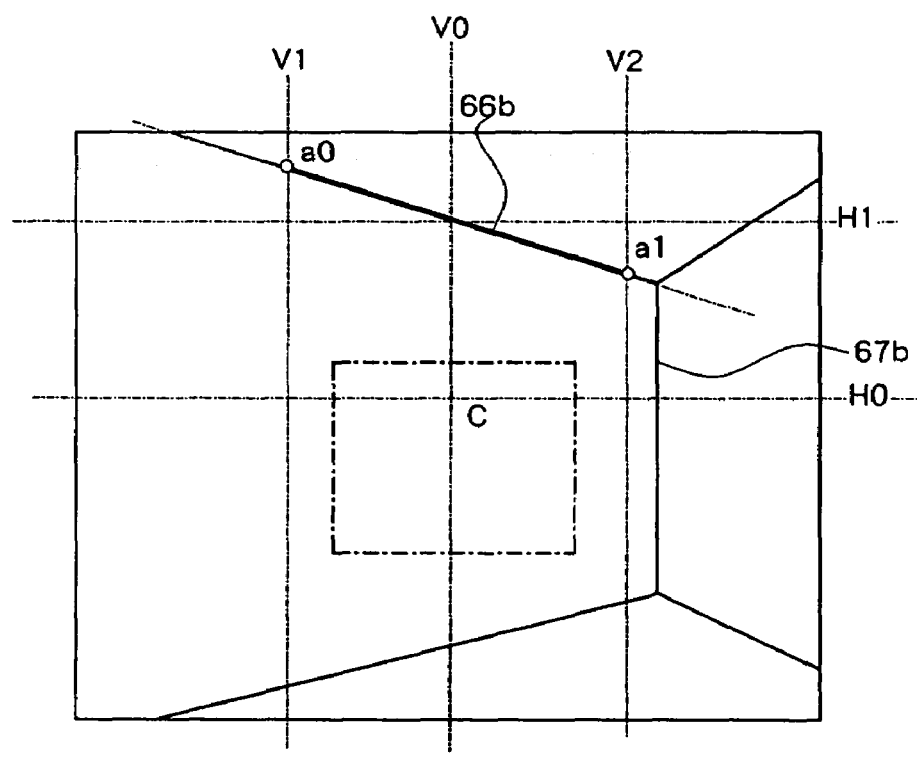

Operation of inclination detector 32 will be described below. FIG. 7 is a view showing a cross line between the front wall and the ceiling that is detected from the captured image shown in FIG. 4. FIGS. 8A and 8B are views showing a cross line between the front wall and the ceiling that is detected from the captured image shown in FIG. 6. FIG. 8A shows the captured image, and FIG. 8B shows horizontal and vertical reference lines to determine the positional information of the cross line in the captured image. The horizontal and vertical reference lines are provided as hypothetical lines and defined with respect to the origin that is established at the center of the captured image. The cross line between the front wall and the ceiling that is detected is shown as a bold line.

As is clear by comparing FIGS. 7, 8A, and 8B, if projector 10 projects an image onto front wall 61, with the main body thereof inclined in a horizontal plane, then image sensor 50 disposed near projection lens 21 is also inclined in a horizontal plane with respect to front wall 61, and, as a result, the cross line is recognized as an inclined cross line in the image.

If the main body of projector 10 is inclined only in a horizontal plane with respect to front wall 61, then the angle of inclination between front wall 61 and the main body of projector 10 can be determined by calculating the angle of inclination, using the positional information recognized by image sensor 50, of cross line 66b between image 61b of the front wall and image 64b of the ceiling in the captured image in FIGS. 8A and 8B.

A process of identifying the angle of inclination between front wall 61 and the main body of projector 10 will be described below. It is assumed that front wall 61 extends vertically and ceiling 64 extends horizontally, front wall 61 and ceiling 64 cross perpendicularly to each other, and the cross line which is generated by the connecting edges of front wall 61 and ceiling 64 extends perpendicularly to the vertical direction. If projector 10 is inclined only in a horizontal plane, then cross line 66b is detected from the image that is captured by image sensor 50 according to the process described above, as shown in FIG. 8A.

As shown in FIG. 8B, left vertical reference line V1 and right vertical reference line V2 are provided at given intervals on the left and right sides of center C of the captured image, respectively. Assume that cross line 66b crosses left vertical reference line V1 and right vertical reference line V2 at cross points a0, a1, respectively, and central vertical reference line V0 that passes center C crosses cross line 66b at a cross point through which first horizontal reference line H1 passes. The positional information of cross points a0, a1 can be represented by coordinates x, y in a two-dimensional coordinate system that has center C as its origin. In FIG. 8B, the section of cross line 66b between cross points a0, a1 is shown as a bold line.

If projection optical axis 27 of projector 10 is inclined only in a horizontal plane with respect to front wall 61, then cross line 67b between image 61b of the front wall and image 62b of the right side wall are captured as a vertical line in the image by imaging device 53 of image sensor 50. The line segment between cross points a0, a1 of cross line 66b, however, does not extend horizontally in the image that is captured by image sensor 50, though the actual cross line between front wall 61 and ceiling 64 extends horizontally.

Figure 9A:
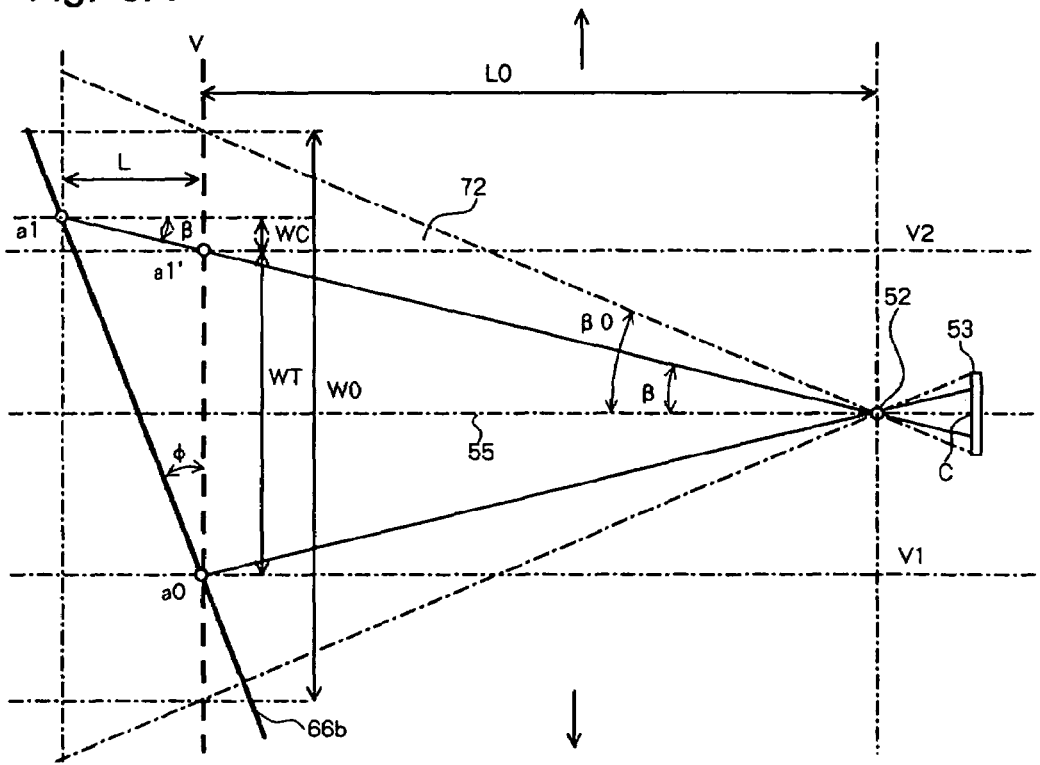
FIGS. 9A and 9B are plan and side elevational views, respectively, showing the relationship between the actual cross line between the front wall and the ceiling shown in FIGS. 5A and 5B and the image of the cross line in the image that is captured by the imaging device of the image sensor.
Figure 9B:
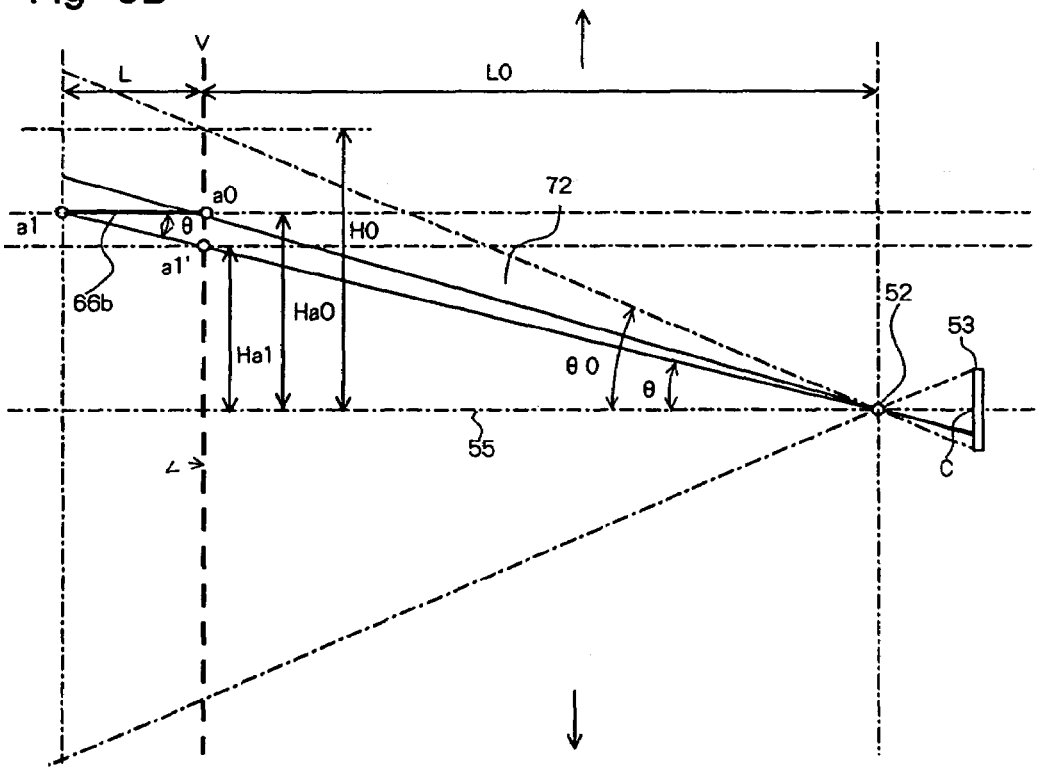

FIGS. 9A and 9B are plan and side elevational views, respectively, showing the relationship between the actual cross line between the front wall and the ceiling shown in FIGS. 5A and 5B, and the image of the cross line in the image that is captured by the imaging device of the image sensor. Broken line V in FIGS. 9A and 9B represents hypothetical plane V for explaining the imaging surface of imaging device 53 of image sensor 50. Hypothetical plane V extends perpendicularly to optical axis 55 that passes center C of the imaging surface of imaging device 53 and center 52 of imaging lens 51. Hypothetical plane V is displayed at a reduced scale on the imaging surface of imaging device 53 which extends parallel to hypothetical plane V.

If hypothetical plane V passes cross point a0 in FIGS. 9A and 9B, two cross points a0, a1 of cross line 66b with left vertical reference line V1 and right vertical reference line V2 are captured as a0 and a1' on hypothetical plane V. Now assume that:

(1) the distance between cross point a1 and hypothetical plane V is represented by L,
(2) the distance between hypothetical plane V and imaging lens center 52 parallel to optical axis 55 is represented by L0,
(3) the distance between cross points a1, a1' in a direction perpendicular to optical axis 55 in a horizontal plane is represented by WC,
(4) the horizontal distance between cross points a0, a1' on hypothetical plane V is represented by WT,
(5) the angle formed between optical axis 55 and a line interconnecting imaging lens center 52 and cross point a1 in the horizontal plane is represented by $\beta$,
(6) the angle formed between optical axis 55 and a limit line of image sensor imaging range 72 in the horizontal plane is represented by $\beta 0$,
(7) the angle formed between cross line 66b and hypothetical plane V is represented by $\phi$,
(8) the vertical distance between the horizontal plane including optical axis 55 and cross point a0 is represented by Ha0,
(9) the vertical distance between the horizontal plane including optical axis 55 and cross point a1' is represented by Ha1,
(10) the vertical distance between the horizontal plane including optical axis 55 and a cross point between the limit line of image sensor imaging range 72 and hypothetical plane V is represented by H0,
(11) the angle formed between optical axis 55 and a line interconnecting imaging lens center 52 and cross point a1 in a vertical plane is represented by $\theta$, and
(12) the angle formed between optical axis 55 and the limit line of image sensor imaging range 72 is represented by $\theta 0$.

Actual cross points a0, a1 are arranged horizontally. However, since image sensor 50 has three-dimensional radial-shaped range 72, when line segment a0-a1 of cross line 66b is observed in the lateral direction as shown in FIG. 9B, cross point a1 is captured as if it rotated at angle $\theta$ to the entire angle ($\theta 0 \times 2$) of the imaging range of image sensor 50. In other words, because the two-dimensional image is captured by image sensor 50 as a collection of points projected onto hypothetical plane V in FIG. 9B, cross point a1 is captured as if it was projected onto point a1' on hypothetical plane V.

Distance L between cross point a1 and hypothetical plane V is determined by the following equations:

$$\tan \theta 0 = H0/L0, L0 = H0/\tan \theta 0$$

$$\tan \theta = Ha1/L0, L0 = Ha1/\tan \theta$$

$$H0/\tan \theta 0 = Ha1/\tan \theta, \tan \theta = \tan \theta 0 \times Ha1/H0$$

Because tan θ0 is known, and Ha1, H0 can be determined from the image that is generated by imaging device 53, tan θ, and hence θ, can be calculated. Distance L then can be determined by the following equation for triangle a0, a1, a1':

$$L=(Ha0-Ha1)/\tan\theta$$

Referring to FIG. 9A, line segment a0-a1 of cross line 66b is inclined to hypothetical plane V. As described above with reference to FIG. 9B, since the image captured by image sensor 50 has three-dimensional radial-shaped range 72, actual point a1 is captured as point a1' on hypothetical plane V, as shown in FIG. 9A. The angle of inclination φ of front wall 61 with respect to a plane perpendicular to optical axis 55 of image sensor 50, which is to be determined last, can be determined by the following equations. First, tan β can be determined by the following equations, since the angle β0 of image sensor imaging range 72 is known, and WT and W0 is determined from the image that is captured by imaging device 53 and shown in FIGS. 8A and 8B:

$$\tan\beta0=W0/2L0, L0=W0/2\tan\beta0$$

$$\tan\beta=WT/2L0, L0=WT/2\tan\beta$$

$$W0/2\tan\beta0=WT/2\tan\beta, \tan\beta=\tan\beta0\times WT/W0$$

Next, angle φ of inclination can be determined by the following equations, because WC and WT are determined from the image that is captured by imaging device 53:

$$L=WC/\tan\beta$$

$$\phi=\tan^{-1}\{L/(WC+WT)\}$$

Because the above calculations involve trigonometric functions which pose a very heavy load on central processing unit 60 incorporated in the projector, the horizontal angle of inclination may be determined by referring to a table which was prepared in advance and represents the relationship between the horizontal angle of inclination between optical axis 27 and projection surface 70, and the variables which are obtained from the positional information. Alternatively, the above calculations may be processed by a high-performance CPU. Since tan θ/tan θ approximately equal θ/θ0, distance L may be determined by the following approximation without any significant error:

$$\theta=\theta0\times Ha1/H0$$

According to another process for reducing the amount of calculations to be performed by central processing unit 60, the above trigonometric values may be stored as data table in a memory, and the stored data may be read from the memory. Alternatively, a table may be stored in and read from a memory which represents the relationship between points a0, a1 which are expressed by (x, y) coordinates such as (xa0, ya0), (xa1, ya1) on the image sensor, and angle data. The relationship between points a0, a1 and any other data that are required for the final image conversion may also be stored in the memory. This process allows for great reduction of the amount of calculations to be performed by central processing unit 60.

The lens of an image sensor usually has a distortion. It is often necessary, in the present embodiment as well, to take such a lens distortion into account in order to calculate the positional information accurately. In this case, the positional information of a point obtained by the image sensor may be represented as positional information (x0, y0), and the positional information (x0, y0) may be converted into positional information (x0', y0') prior to the above calculation, by referring to a distortion correcting table. It is possible, in this way, to correct trapezoidal distortions of the lens of the image sensor taking into account the distortions of the lens, and it is not necessary to correct the distortions in a separate process.

Image distortion correcting circuit 33 generates corrective parameters for correcting the trapezoidal distortion of the image, by using the angle of inclination identified by the above process, according to a known process. These parameters are applied to the inputted image, and the trapezoidal distortion thereof can automatically be corrected.

Figure 10:
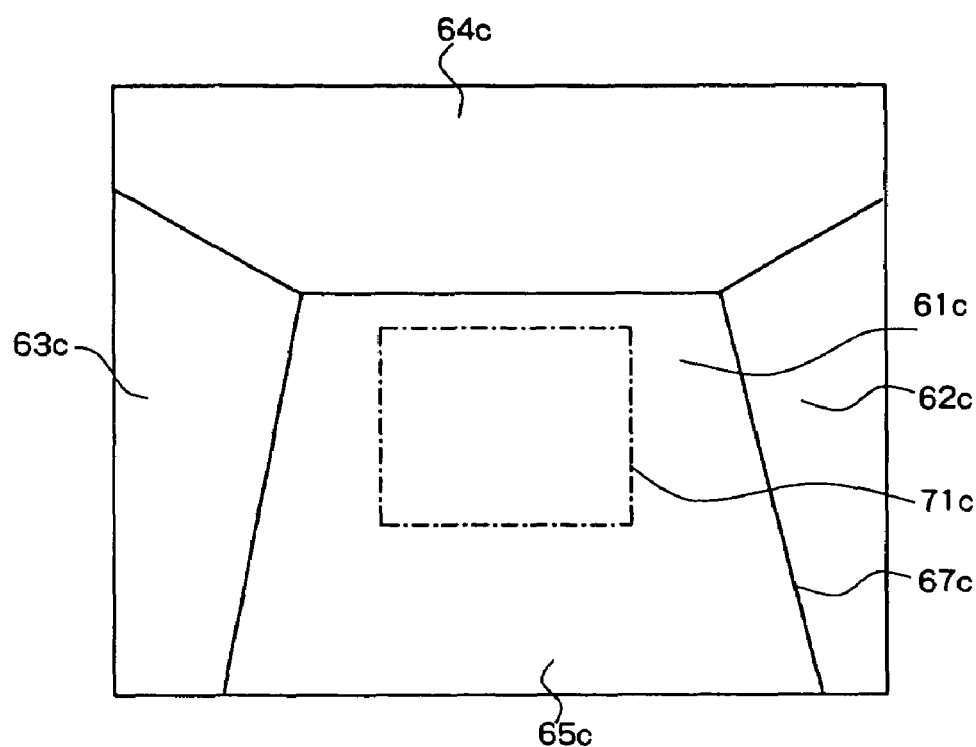
FIG. 10 is a view showing an image captured by the imaging device of the image sensor when the projector is set such that the main body of the projector is inclined only vertically with respect to the front wall.

If the main body of projector 10 is inclined only vertically with respect to front wall 61, then an image is captured by image sensor 50 as shown in FIG. 10. FIG. 10 is a view showing an image captured by the imaging device of the image sensor when the projector is set such that the main body of the projector is inclined only vertically with respect to the front wall. In this case, as with the case in which the projector is inclined only in the horizontal plane with respect to the front wall, the angle of inclination of cross line 67c between image 61c of the front wall and image 62c of the right side wall can be calculated in the same manner as described above. The angle of inclination of the main body of projector 10 can be then calculated with respect to front wall 61 in the vertical direction, which allows projector 10 to automatically correct a trapezoidal distortion of the projected image.

Figure 11A:
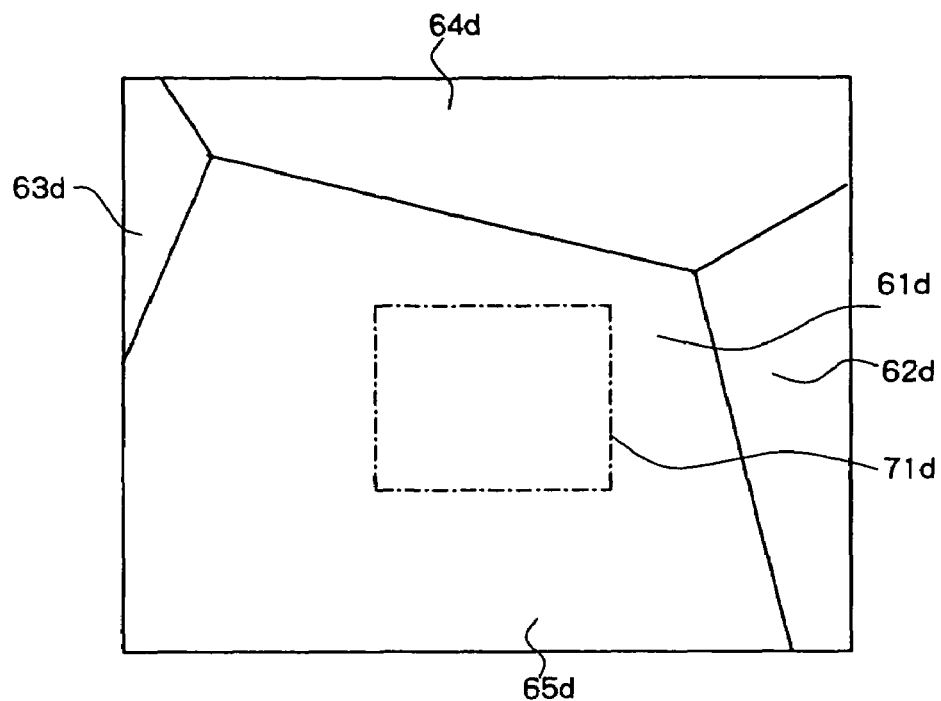
FIGS. 11A and 11B are views showing an image captured by the imaging device of the image sensor when the projector is set such that the projector is inclined horizontally and vertically with respect to the front wall.
Figure 11B:
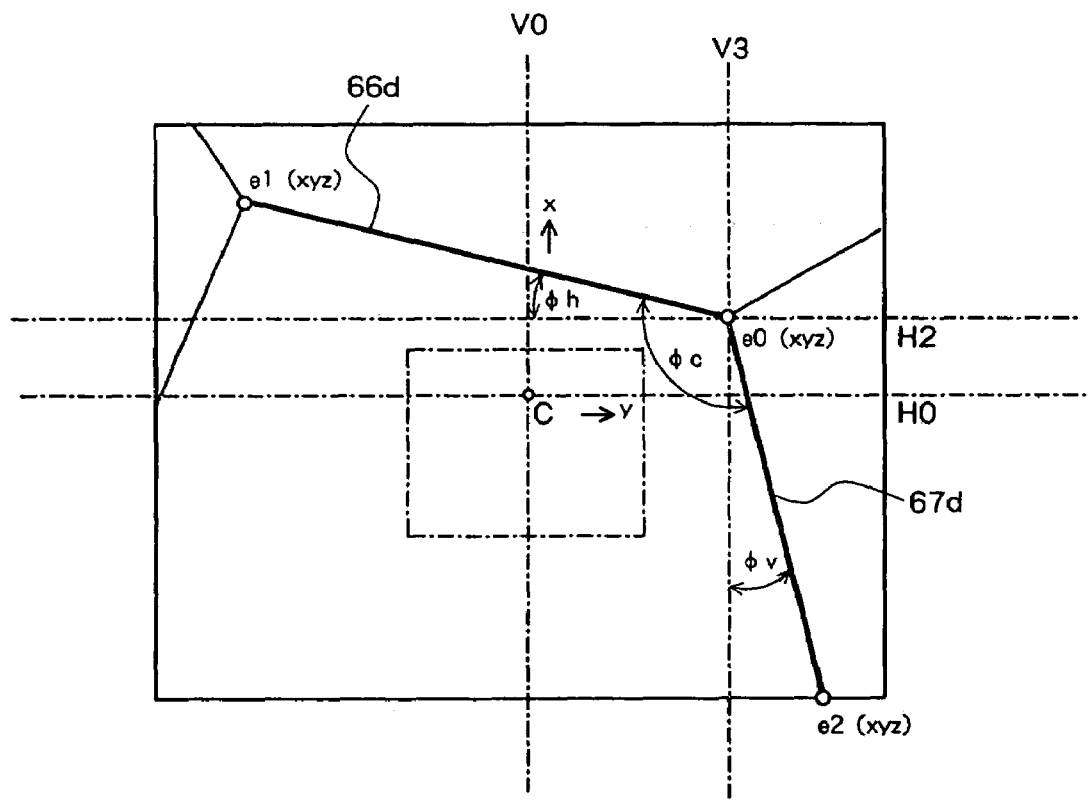

A process for calculating an angle of inclination when the main body of projector 10 is inclined both horizontally and vertically with respect to front wall 61 will be described below. In this case, an image shown in FIGS. 11A and 11B is captured by the image sensor. FIGS. 11A and 11B are views showing an image captured by the imaging device of the image sensor when the projector is set such that the projector is inclined horizontally and vertically with respect to the front wall. FIG. 11A shows the captured image, and FIG. 11B shows the highlighted cross lines. Cross line 66d and cross line 67d join at cross point e0. Cross line 66d has left end point e1 in the image. Cross line 67d and the limit line of the imaging range cross each other at cross point e2. Central vertical reference line V0 and central horizontal reference line H0 pass image center C, which is the origin. Right vertical reference line V3 and second horizontal reference line H2 pass cross point e0. In this process, cross line 66d between image 61d of the front wall and image 64d of the ceiling, and cross line 67d between image 61d of the front wall and image 62d of the right side wall, are extracted first. Then the x, y, and z coordinates of cross point e0, end point e1, and cross point e2 are calculated.

Line segments e0-e1, e0-e2 can be expressed explicitly by the coordinates (x, y, z) of cross point e0, angles φh formed between line segment e0-e1 and the horizontal line, the angles φv formed between line segment e0-e2 and the vertical line, and angle φc formed between these line segments.

Figure 12A:
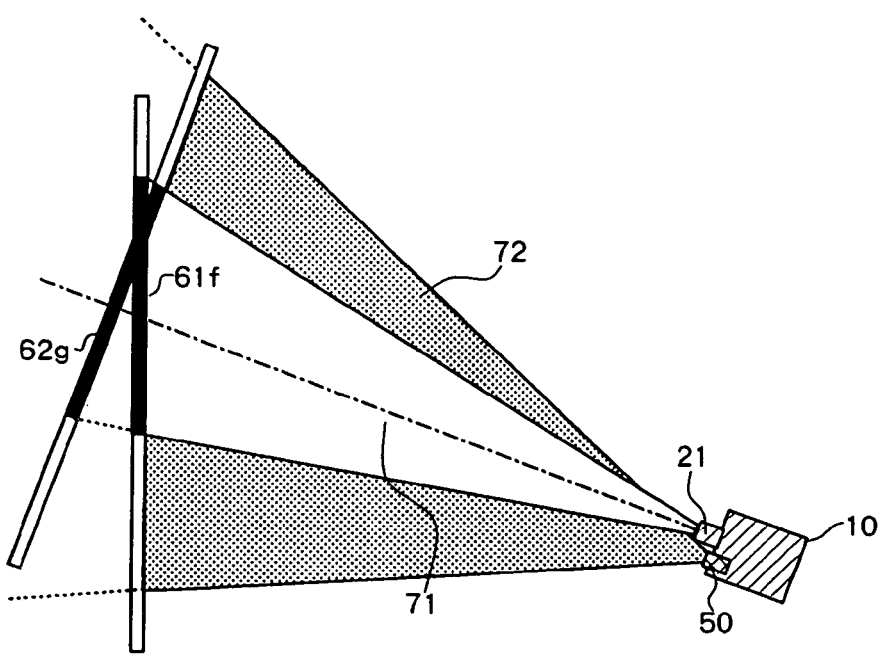
FIGS. 12A and 12B are views showing the relationship between the projector and the front wall, when the front wall faces the projector head-on and inclined with respect to the projector.
Figure 12B:
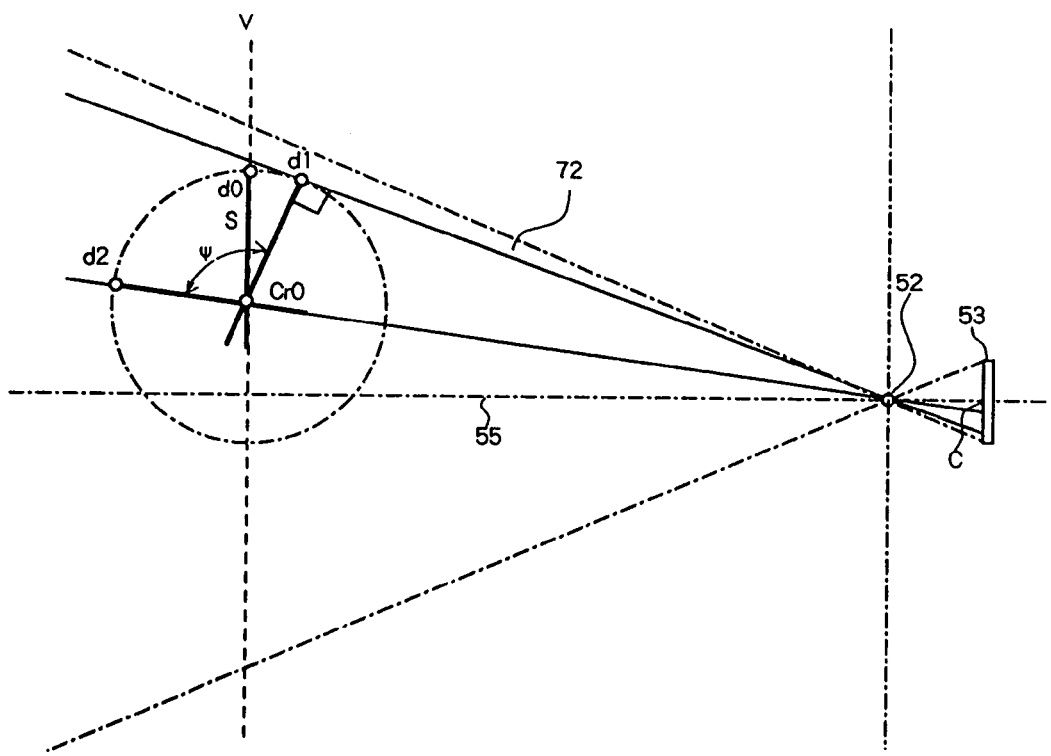

FIGS. 12A and 12B are views showing the relationship between the projector and the front wall, when the front wall faces the projector head-on and is inclined with respect to the projector. In these figures, the projector is assumed to be fixed, and the front wall is assumed to rotate with respect to the fixed projector. FIG. 12B is a plan view showing line segment S representing a vertical wall that rotates in the imaging range of image sensor. Line segment S rotates about pivot point Cr0, i.e., moves in the back-and-forth direction when viewed from image sensor 50. As line segment S rotates about pivot point Cr0, reference point d0 positioned at the end of line segment S moves toward point d1 or point d2.

The movement of reference point d0 can be detected within the range represented by angle ψ in the image that is captured by the image sensor. The angle ψ is defined by point d2 where reference point d0 overlaps with pivot pint Cr0 when viewed from image sensor 50 (This situation normally does not occur, since it means that the wall rotates to an angular position where the wall is recognized as being overlapped with image sensor 50), and by point d1 where a hypothetical line drawn from image sensor 50 forms a right angle with line segment S (The right side of the wall is recognized as being turned toward image sensor 50, when vied from image sensor 50). In any case, the reference point which corresponds to the image of a cross line moves with the rotation of hypothetical plane V. If the angle of inclination of projector 10 is 0 degree with respect to the front wall, then the cross line is horizontal or vertical as shown in FIGS. 4A and 4B. Thus, the angle of inclination of projector 10 can be determined with respect to the front wall, by rotating hypothetical plane V about the x-axis and the y-axis to transform the coordinates of cross points e0, e1, e2, and by finding a rotational angle at which line segment e0-e1 and line segment e0-e2 lie horizontally and vertically, respectively.

Alternatively, the inclination of the front wall can be calculated by identifying e0 (x, y, z), φh, φv, φc in the image, shown in FIG. 11B, that is captured by image sensor 50. Since the rotational angle of the image sensor can be identified together with these parameters, the angle of inclination of the main body of projector 10 can also be detected with respect to the vertical direction. Inclination detector 32 of trapezoidal distortion correcting device 30 calculates the parameters of the projection surface such as a position and a shape of thereof, based on the detected angle of inclination of the main body of projector 10 with respect to the wall surface. The calculated parameters are applied to image distortion correcting circuit 33, and projection device 20 automatically projects an appropriately shaped image, i.e., a distortion-free image, onto the wall surface.

Usually, projectors should preferably be installed such that a projected image is displayed not onto a ceiling or side walls, but onto a front wall only. Since the positional information of the cross line is obtained from the detected angle of inclination, it is possible to reduce the projected image onto the front wall only.

In the above embodiment, the angle of inclination between the projector and the front wall is acquired by using the cross line between the front wall and a surface that is connected to the front wall. However, this angle may also be acquired by using a contact line between the front wall and, for example, a horizontal desk in contact with the front wall.

Figure 13:
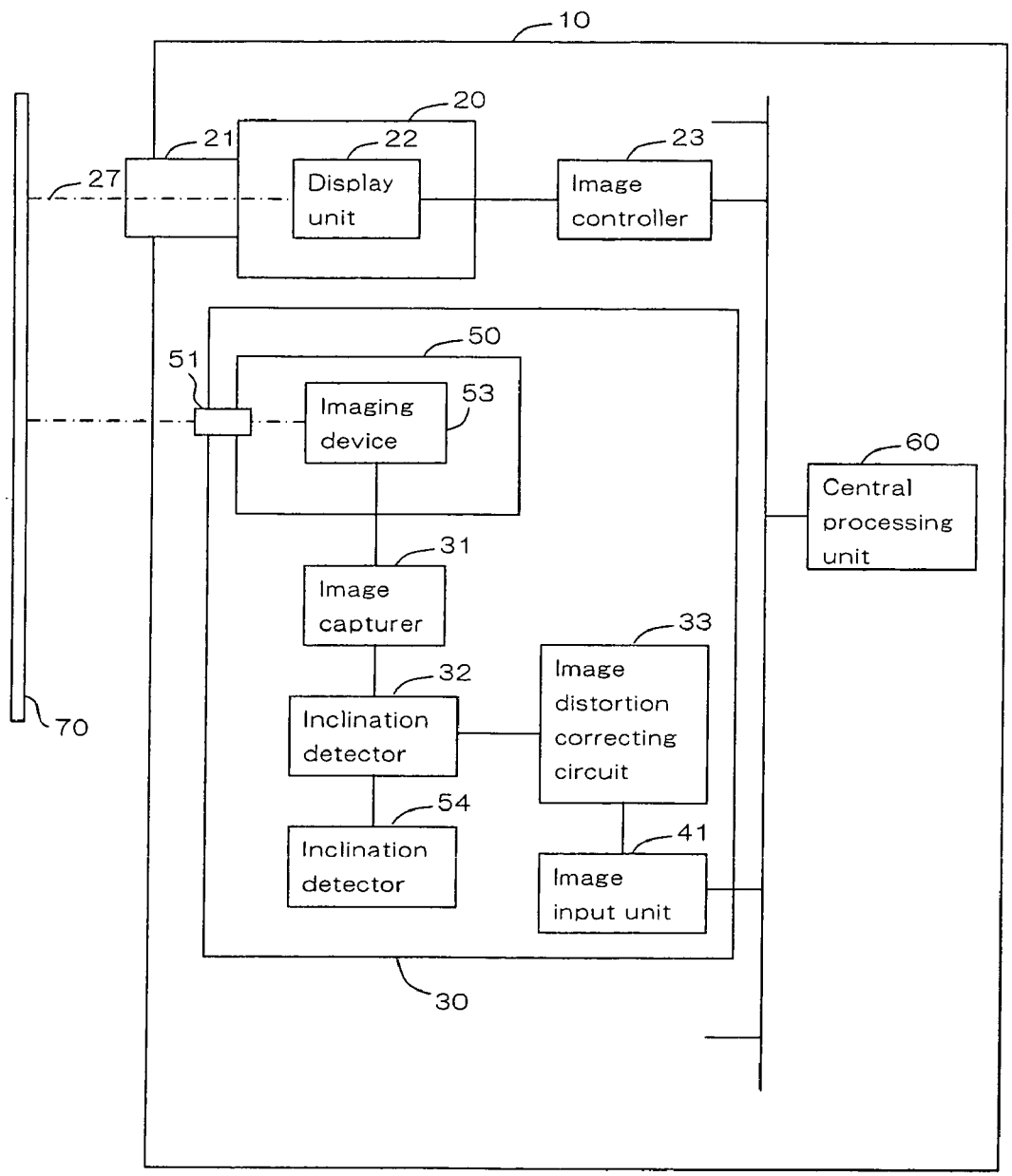
FIG. 13 is the block diagram of a projector having a trapezoidal distortion correcting device according to the second embodiment of the present invention.

A process for calculating an angle of inclination between the projection optical axis and the projection surface in a trapezoidal distortion correcting device of a projector according to a second embodiment of the present invention will be described below. FIG. 13 is the block diagram of a projector having a trapezoidal distortion correcting device according to the second embodiment of the present invention. Trapezoidal distortion correcting device 30 has an inclination sensor (G sensor) using a conventional acceleration detector used, for example, for centering a machine when it is installed. The inclination sensor is a vertical inclination sensor 54 for accurately measuring an angle of inclination with respect to the gravitational direction and for outputting the measured angle of inclination as numerical data. Other details of the projector according to the second embodiment are identical to the projector according to the first embodiment, and those parts identical to the first embodiment are denoted by identical reference numerals, and will not be described in detail below.

According to the first embodiment, a trapezoidal distortion of an image is corrected based only on the information obtained from an image that is captured by image sensor 50. In order to acquire the angles of inclination in the horizontal and vertical directions of projector 10 with respect to front wall 61, it is necessary that a horizontal cross line, such as cross line 66 between front wall 61 and ceiling 64, and a vertical cross line, such as cross line 67 between front wall 61 and right side wall 62, be included in the image sensor imaging range. Since images are usually projected onto an upper area of a wall, cross line 66 between front wall 61 and ceiling 64 is usually included in image sensor imaging range 72. However, because images are generally projected toward the central upper area of a wall, cross lines 67 between front wall 61 and side walls 62, 63 are often excluded in image sensor imaging range 72.

If an image distortion is corrected based only on cross line 66 between front wall 61 and ceiling 64, then the main body of projector 10 needs to be placed horizontally, because image distortion is not corrected with respect to a vertical inclination. Consequently, if there is a vertical inclination, then the image distortion is not corrected properly.

According to the second embodiment, an angle of inclination in the vertical direction is detected by vertical inclination sensor 54, and is inputted to inclination detector 32. Image capturer 31 captures the image from imaging device 53, and supplies inclination detector 32 with the positional information of cross line 66 between front wall 61 and ceiling 64. Inclination detector 32 calculates an angle of inclination in the horizontal direction based on the positional information. Inclination detector 32 outputs the calculated angle of inclination in the horizontal direction, together with the angle of inclination in the vertical direction that is detected by vertical inclination sensor 54, to image distortion correcting circuit 33. Image distortion correcting circuit 33 generates LSI control parameters, corrects trapezoidal distortions in the vertical and horizontal directions of the image input from image that is inputted unit 41, and outputs corrected image data to image controller 23.

In the illustrated embodiment, vertical inclination sensor 54 is an acceleration sensor or a gravitational sensor utilizing the gravity. However, vertical inclination sensor 54 may be a device for detecting the tilt angle of a tilting mechanism of the main body of projector 10.

Figure 14:
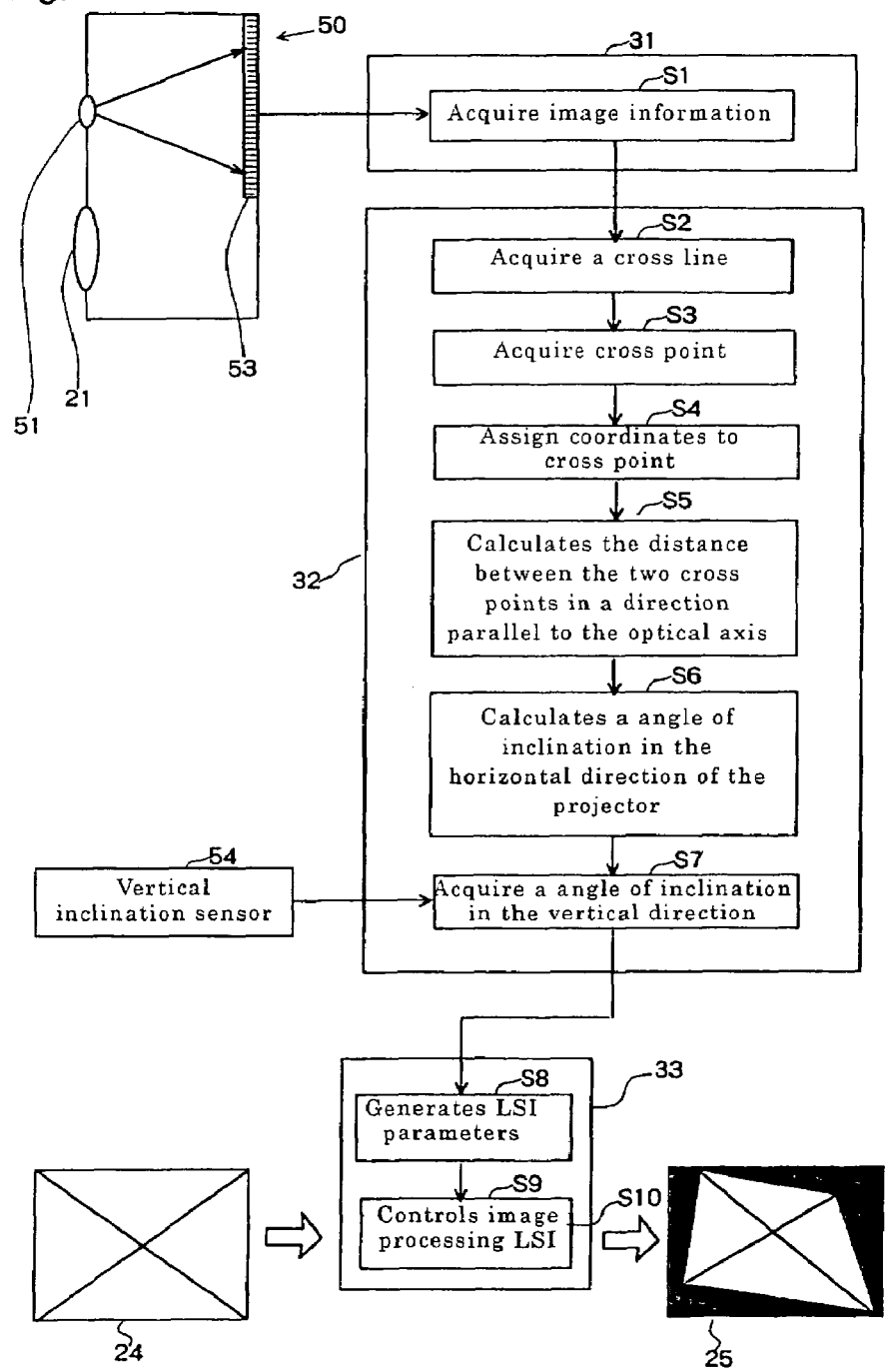
FIG. 14 is the flowchart of a process for correcting a trapezoidal distortion according to the second embodiment.

A process for correcting a trapezoidal distortion according to the second embodiment will be described below with reference to FIG. 14. This process includes a process of identifying an angle of inclination in the horizontal direction based on the positional information of a cross line between a wall surface and a ceiling in an image sensor imaging range, acquiring an angle of inclination in the vertical direction from a vertical inclination sensor, and correcting an output image on a display unit in the projection. First, image capturer 31 acquires image information from imaging device 53 of image sensor 50 in step S1. Then, inclination detector 32 acquires cross line 66b between image 61b of the front wall and image 64b of the ceiling from the image information in step S2, acquires cross points a0, a1 of left and right reference lines V1, V2 and cross line 66b in the image in step S3. Inclination detector 32 then assigns coordinates to cross points a0, a1 in step S4. Thereafter, inclination detector 32 calculates the distance between the two cross points in a direction parallel to the optical axis, based on the distance between the two cross points in the vertical direction, the distance in the vertical direction between optical axis 55 and a limit line of the image sensor imaging range, and vertical angle θ0 of the image sensor imaging range in step S5. Next, inclination detector 32 calculates an angle of inclination in the horizontal direction of the projector, based on the distance between the two cross points in the direction parallel to the optical axis, the distance between the two cross points in the horizontal direction, and horizontal angle β0 of the image sensor imaging range in step S6, acquires an angle of inclination in the vertical direction of the projector from vertical inclination sensor 54 in step S7, and outputs the acquired and calculated angle data to image distortion correcting circuit 33. Image distortion correcting circuit 33 generates LSI control parameters in step S8, and controls the projector image processing LSI circuit in step S9. Input image 24 is then corrected, and display unit 22 generates output image 25 in step S25. When output image 25 is projected onto projection surface 70, an image similar to input image 24 is displayed on projection surface 70.

Figure 15:
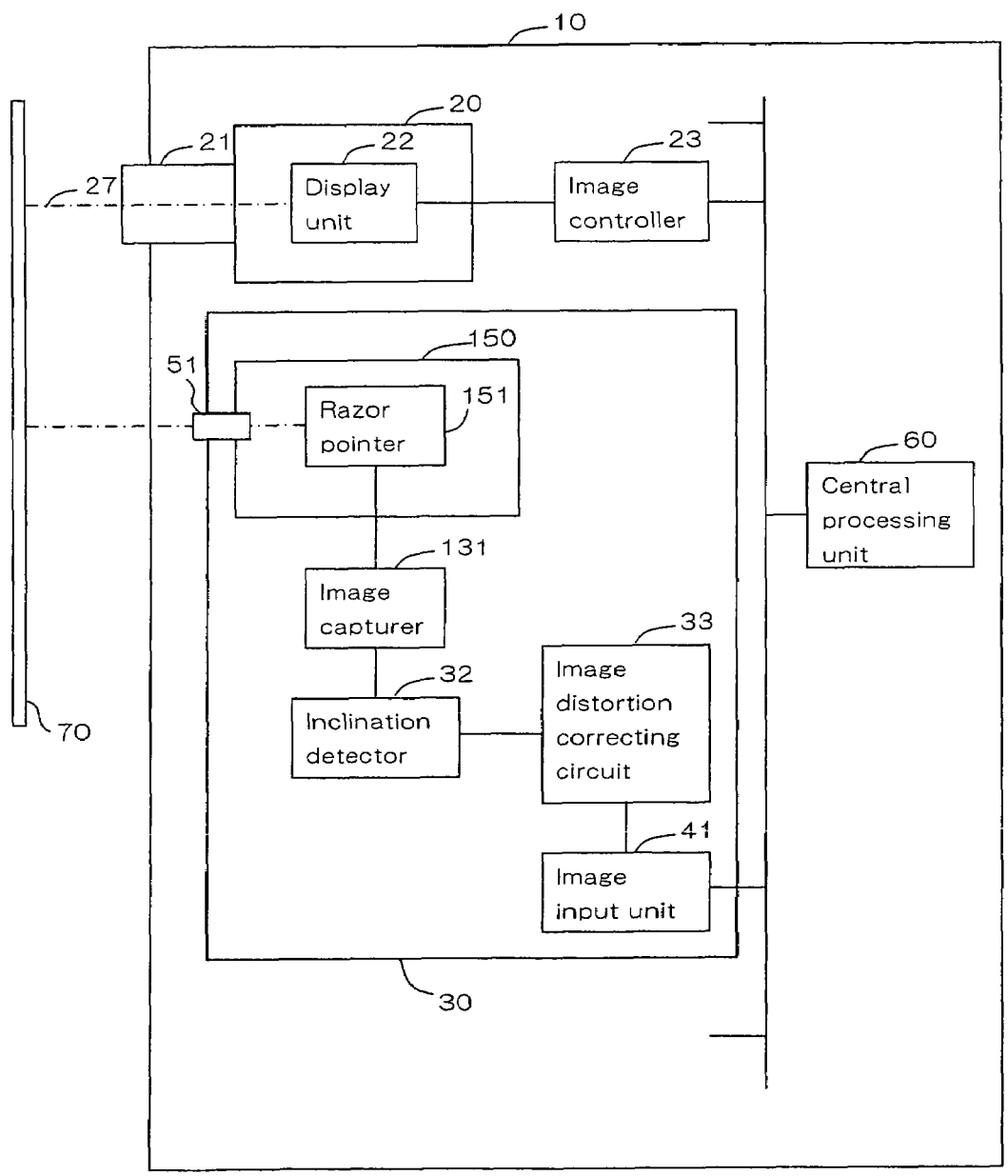
FIG. 15 is the block diagram of the projector having the trapezoidal distortion correcting device according to the third embodiment.

A process for calculating an angle of inclination between the projection optical axis and the projection surface in a trapezoidal distortion correcting device of a projector according to a third embodiment of the present invention will be described below. FIG. 15 is the block diagram of the projector having the trapezoidal distortion correcting device according to the third embodiment of the present invention.

In the first and second embodiments, image sensor 50 and image capturer 31 acquire positional information of a cross line between a plane which serves as the projection surface and a plane which crosses the plane. According to the third embodiment, laser positioning device 150 and position acquirer 131 are used to acquire positional information of the cross line. Laser positioning device 150 points laser beams at desired positions by means of laser pointer 151 that is capable of projecting a laser beam within a predetermined range including an image that is projected by the projector. When two or more points are selected at desired positions on a cross line between a plane which serves as the projection surface and another plane, position acquirer 131 acquires positional information of the cross line in a hypothetical image, and outputs the acquired positional information to inclination detector 32. In the same manner as with the first and second embodiments, inclination detector 32 processes the supplied positional information to calculate an angle of inclination between projection optical axis 27 of projection device 20 and projection surface 70.

The projector according to the third embodiment is identical in arrangement and operation to the projector according to the first embodiment, except that laser positioning device 150 and position acquirer 131 are provided instead of image sensor 50 and image capturer 31. Those parts identical to the first embodiment are denoted by identical reference numerals, and will not be described in detail below.

Various processes are available to acquire positional information of a cross line by means of laser positioning device 150. A typical process will be described below as an example. In this process, a laser positioning device is used that is capable of controlling the direction of the laser beam, and determining the position of the laser beam in a hypothetical image by a signal that is input when the laser beam overlaps with a cross line.

Figure 16A:
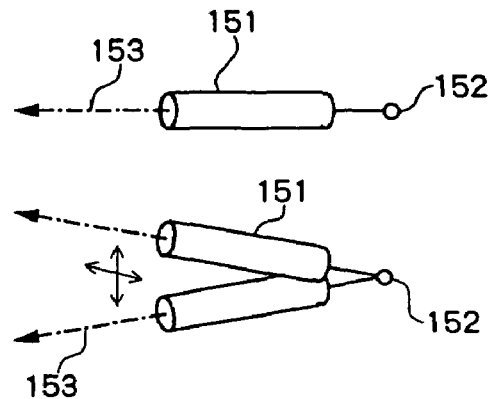
FIGS. 16A through 16C are views showing an arrangement and operation of the laser positioning device.
Figure 16B:
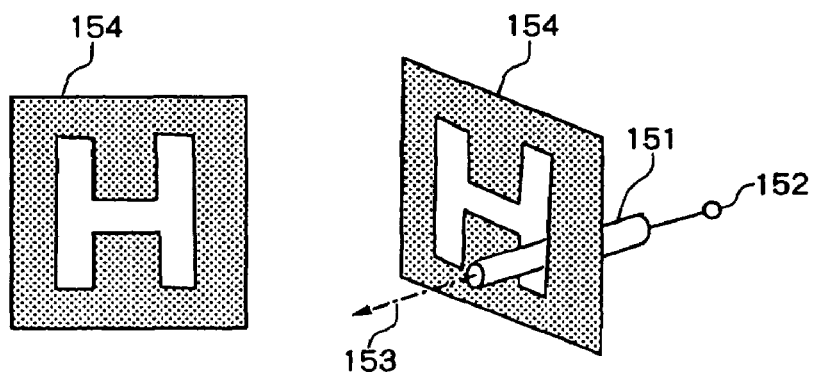
Figure 16C:
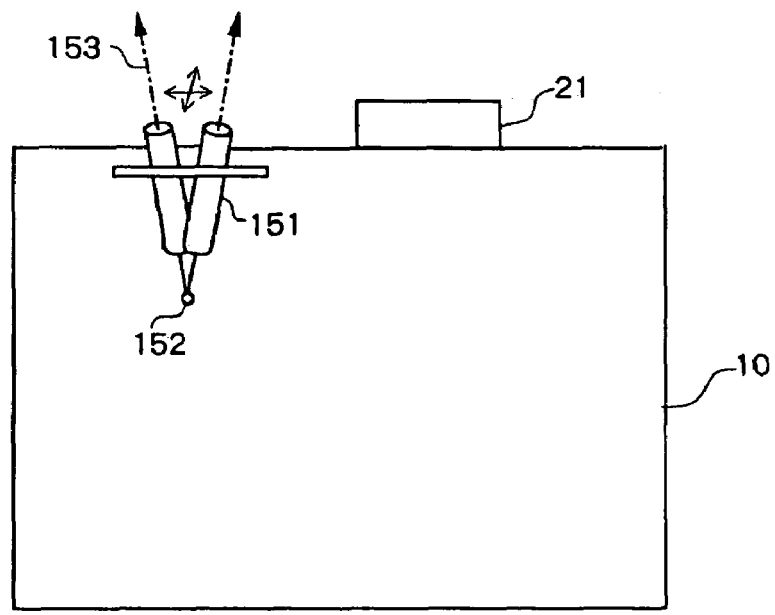

FIGS. 16A through 16C are views showing an arrangement and operation of the laser positioning device. FIG. 16A shows the manner in which the laser pointer operates. FIG. 16B shows the manner in which the movement of the laser pointer is limited. FIG. 16C shows the manner in which the laser positioning device is installed. Laser positioning device 150 has laser pointer 151 that is movable about pivot point 152 in the vertical and horizontal direction, as shown in FIG. 16A. Laser pointer 151 has a tubular member that passes through plate 154 having an H-shaped aperture defined therein, as shown FIG. 16B. Therefore, a laser beam is projected from laser pointer 151 in the directions along the H-shaped aperture. Pivot point 152 is combined with a displacement acquirer (not shown) for measuring displacements (angles) in the horizontal and vertical directions. Laser pointer 1 is manually moved. Laser positioning device 150 is installed near projection lens 21 of projector 10, as shown in FIG. 16C.

Figure 17A:
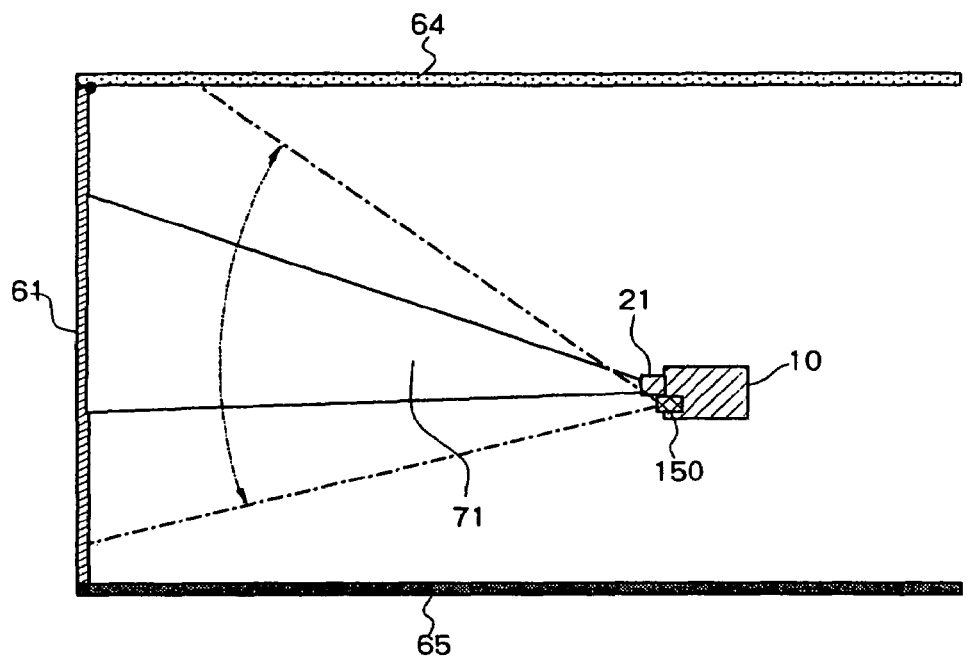
FIGS. 17A and 17B are views that illustrates a process for acquiring a cross line between a front wall serving as a projection surface and a ceiling that is joined to an upper edge of the front wall.
Figure 17B:
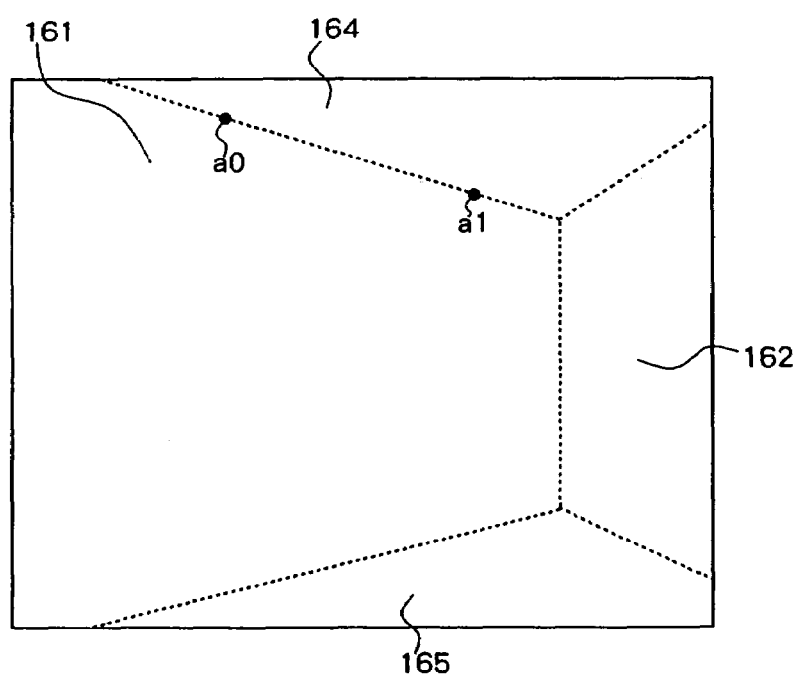

FIGS. 17A and 17B are views that illustrate a process for acquiring a cross line between a front wall serving as a projection surface and a ceiling that is joined to an upper edge of the front wall. FIG. 17A shows a vertical cross-sectional view of a room, and FIG. 17B shows the situation in which two points a0, a1 are acquired in a hypothetical image in the position acquirer. Laser pointer 151 is moved vertically and horizontally, as shown in FIG. 17A, to point the laser beam at a cross line between walls. When the laser beam points to the cross line, a button provided on laser positioning device 150 is pressed in order to identify the position, and laser positioning device 150 outputs the position of the laser beam as positional information into a hypothetical image in position acquirer 131. When two points a0, a1 are acquired in this way in the hypothetical image in position acquirer 131, as shown in FIG. 17B, an angle of inclination of projection optical axis 27 of projector 10 can be acquired with respect to projection surface 70, by the process according to the first embodiment described above with reference to FIGS. 8A, 8B and 9A, 9B.

While preferred embodiments of the present invention have been described using specific terms, such description is for illustrative purposes only, and it is to be understood that changes and variations may be made without departing from the spirit or scope of the following claims.

What is claimed is:

1. A projector comprising:
    a projection device;
    a cross line positional information acquiring device for acquiring positional information of a cross line between a projection surface and an adjacent surface crossing the projection surface;
    an inclination detecting device for calculating an angle of inclination between a projection optical axis of the projection device and the projection surface, based on the positional information acquired by the cross line positional information acquiring device; and
    an image distortion correcting device for correcting a trapezoidal distortion of an input image supplied to the projection device, based on the angle of inclination calculated by the inclination detecting device.

2. A projector according to claim 1, wherein the cross line positional information acquiring device includes an image sensor for capturing a predetermined imaging range including an image projected by the projection device, provided with an imaging lens and an imaging device, and
    wherein the inclination detecting device detects the cross line from an image captured by the imaging device and calculates the angle of inclination, based on positional information of a cross point between the cross line and a reference line established in the imaging range.

3. A projector according to claim 1, wherein the inclination detector is configured to calculate the angle of inclination in a horizontal plane, based on the positional information which is acquired by using a front wall in front of the projection device as the projection surface and a ceiling or a floor crossing the front wall and extending horizontally as the adjacent surface crossing the projection surface.

4. A projector according to claim 1, wherein the inclination detector is configured to calculate the angle of inclination in a vertical plane, based on the positional information which is acquired by using a front wall in front of the projection device as the projection surface and a wall crossing the front wall and extending vertically as the adjacent surface crossing the projection surface.

5. A projector according to claim 1, wherein the inclination detector is configured to calculate the angle of inclination in a horizontal and a vertical plane, based on the positional information which is acquired by using a front wall in front of the projection device as the projection surface, and a ceiling or a floor crossing the front wall and extending horizontally and a wall crossing the front wall and extending vertically as the planes crossing the projection surface.

6. A projector according to claim 2, wherein the inclination detecting device:
   calculates a distance between the two cross points in a direction parallel to the projection optical axis by using a vertical distance between the two cross points, a vertical distance between an optical axis of the image sensor and a limit line of the imaging range of the image sensor, and a vertical angle of the imaging range; and
   calculates the angle of inclination in a horizontal plane by using the distance between two cross points in the direction parallel to the projection optical axis, a horizontal distance between the two cross points, and a horizontal angle of the imaging range.

7. A projector according to claim 2, wherein the inclination detecting device:
   includes a table containing data representative of a relationship:
      (a) between a vertical distance between the two cross point, and the angle of inclination in a horizontal plane;
      (b) between a vertical distance between an optical axis of the image sensor and a limit line of the imaging range of the image sensor, and the angle of inclination in the horizontal plane;
      (c) between a vertical angle of the imaging range, a horizontal distance between the two cross points, and the angle of inclination in the horizontal plane; and
      (d) between a horizontal angle of the imaging range, and the angle of inclination in a horizontal plane, and the angle of inclination in the horizontal plane; and
   calculates the angle of inclination in a horizontal plane based on the table.

8. A projector according to claim 2, wherein the inclination detecting device detects the cross line by detecting a position in the captured image where luminance of a reflected light applied to the imaging device changes.

9. A projector according to claim 2, wherein the projection device projects at least two vertical or horizontal straight line test patterns, and the inclination detecting device acquires bent points in the captured image of a reflected light applied from the test patterns to the imaging device, and calculates a straight line which connects the bent points, thereby detecting the cross line.

10. A projector according to claim 1, wherein the cross line positional information acquiring device includes a laser positioning device for projecting a laser beam in a predetermined range which includes an image projected by the projection device, and a position acquirer for acquiring positional information of a projected position in a hypothetical image; and
    the inclination detecting device detects the cross line by using the positional information in the hypothetical image, and calculates the angle of inclination based on positional information of a cross point of the cross line and a predetermined reference line established in the hypothetical image.

11. A projector comprising:
    a projection device;
    a cross line positional information acquiring device for acquiring positional information of a cross line between a projection surface and an adjacent surface crossing the projection surface;
    a vertical angle-of-inclination acquiring device for detecting an angle of inclination of a projection optical axis of the projection device in a vertical plane;
    an inclination detecting device for calculating an angle of inclination between the projection optical axis and the projection surface in a horizontal plane, based on the positional information acquired by the cross line positional information acquiring device; and
    an image distortion correcting device for correcting a trapezoidal distortion of an input image supplied to the projection device, based on the angle of inclination in the horizontal plane calculated by the inclination detecting device, and based on the angle of inclination in the vertical plane detected by the vertical angle-of-inclination acquiring device.

12. A projector according to claim 11, wherein the cross line positional information acquiring device includes an image sensor for capturing a predetermined imaging range including an image projected by the projection device;
    the vertical angle-of-inclination acquiring device includes a vertical inclination sensor for detecting an angle of inclination of the projection optical axis in the vertical plane; and
    the inclination detecting device includes an inclination detector for detecting the cross line between a front wall in front of the projection device and a ceiling or a floor crossing the front wall and extending horizontally by using an image captured by the imaging device, for calculating the angle of inclination in the horizontal plane based on positional information of a cross point of the cross line and a reference line established in the imaging range, and for acquiring the angle of inclination in the vertical plane from the vertical inclination sensor.

13. A projector according to claim 12, wherein the inclination detecting device:
    calculates a distance between two of the cross points in a direction parallel to the projection optical axis by using a vertical distance between the two cross points, a vertical distance between an optical axis of the image sensor and a limit line of the imaging range of the image sensor, and by using a vertical angle of the imaging range; and
    calculates the angle of inclination in a horizontal plane by using the distance between two cross points in the direction parallel to the projection optical axis, a horizontal distance between the two cross points, and a horizontal angle of the imaging range.

14. A projector according to claim 12, wherein the inclination detecting device:
    includes a table containing data representative of a relationship:
       (a) between a vertical distance between the two cross point, and the angle of inclination in a horizontal plane;
       (b) between a vertical distance between an optical axis of the image sensor and a limit line of the imaging range of the image sensor, and the angle of inclination in the horizontal plane;
       (c) between a vertical angle of the imaging range, a horizontal distance between the two cross points, and the angle of inclination in the horizontal plane; and (d) between a horizontal angle of the imaging range, and the angle of inclination in a horizontal plane, and the angle of inclination in the horizontal plane; and calculates the angle of inclination in a horizontal plane based on the table.

15. A projector according to claim 12, wherein the inclination detecting device detects the cross line by detecting a position in the captured image where luminance of a reflected light applied to the imaging device changes.

16. A projector according to claim 12, wherein the projection device projects at least two vertical or horizontal straight line test patterns, and the inclination detecting device acquires bent points in the captured image of a reflected light applied from the test patterns to the imaging device, and calculates a straight line which connects the bent points, thereby detecting the cross line.

17. A method for correcting a trapezoidal distortion of a projector, comprising:

acquiring positional information of a cross line between a projection surface and a an adjacent surface crossing the projection surface;

calculating an angle of inclination between a projection optical axis of the projection device and the projection surface, based an the acquired positional information; and correcting the trapezoidal distortion of an input image supplied to the projection device, based on the calculated angle of inclination.

18. A method of correcting a trapezoidal distortion of a projector, comprising:

acquiring positional information of a cross line between a projection surface and a an adjacent surface crossing the projection surface;

calculating an angle of inclination in a horizontal plane between a projection optical axis of the projection device and the projection surface, based on the acquired positional information;

calculating an angle of inclination of the projection optical axis in a vertical plane based on gravitational acceleration; and correcting the trapezoidal distortion of an input image supplied to the projection device, based on the calculated angles of inclination in the horizontal and vertical planes.

19. A projector according to claim 1, wherein the cross line positional information acquiring device acquires the positional information of a horizontal cross line between the front wall surface serving as the projection surface and a ceiling or a floor which crosses the projection surface.

20. A projector according to claim 1, wherein the cross line positional information acquiring device acquires the positional information of a vertical cross line between the projection surface and a side wall surface which crosses the projection surface.

* * * * *